(12) United States Patent
Skala

(10) Patent No.: US 11,138,575 B2
(45) Date of Patent: Oct. 5, 2021

(54) METHOD AND SYSTEM FOR PROCESSING ON-DEMAND SUBSTITUTE CHECKS

(71) Applicant: Thomas Skala, Encino, CA (US)

(72) Inventor: Thomas Skala, Encino, CA (US)

(73) Assignee: ALLCOM A NEVADA CORPORATION, Las Vegas, NV (US)

( * ) Notice: Subject to any disclaimer, the term of this patent is extended or adjusted under 35 U.S.C. 154(b) by 434 days.

(21) Appl. No.: 15/640,072

(22) Filed: Jun. 30, 2017

(65) Prior Publication Data

US 2018/0005202 A1 Jan. 4, 2018

Related U.S. Application Data

(60) Provisional application No. 62/357,864, filed on Jul. 1, 2016.

(51) Int. Cl.
*G06Q 20/10* (2012.01)
*G06Q 20/14* (2012.01)
*G06Q 20/20* (2012.01)

(52) U.S. Cl.
CPC ............ *G06Q 20/10* (2013.01); *G06Q 20/14* (2013.01); *G06Q 20/20* (2013.01)

(58) Field of Classification Search
CPC ........ G06Q 20/00; G06Q 20/10; G06Q 20/14; G06Q 20/20; H04W 4/12
USPC ...................................................... 705/39, 44
See application file for complete search history.

(56) References Cited

U.S. PATENT DOCUMENTS

| | | | |
|---|---|---|---|
| 8,160,959 B2* | 4/2012 | Rackley, III | G06Q 20/042 705/39 |
| 2002/0083088 A1* | 6/2002 | Gundy | G06Q 20/04 715/205 |
| 2012/0253990 A1 | 10/2012 | Skala | |
| 2013/0259028 A1 | 10/2013 | Skala | |
| 2014/0156512 A1* | 6/2014 | Rahman | G06Q 20/10 705/39 |
| 2016/0071069 A1 | 3/2016 | Skala | |

* cited by examiner

*Primary Examiner* — Scott C Anderson
*Assistant Examiner* — Marla Hudson
(74) *Attorney, Agent, or Firm* — Jason P. Webb; Pearson Butler

(57) ABSTRACT

A method and system for processing a payment over a computerized network. An icon generating module automatically generates active payment icons for the payee associated with particular payment obligations, each including a link to the computerized payment interface and machine-readable information regarding the specific payment to be made, and automatically generates active payment icons having alternative programming associated with a plurality of utilization modes (e.g. for use with SmartTVs, mobile devices). A payment processing system generates substitute checks for the payor and is a non-bank e-wallet account which uses a phone number as the account number. An interactive user interface is activated on selection of an active payment icon such that machine-readable information regarding the specific payment is displayed together with interactive user interface tools for effecting payment thereof through the payment processing system.

18 Claims, 28 Drawing Sheets

| Computerized payment interface 100 ||
|---|---|
| Icon Generating Module 110 | Payment Processing System 120 |
| Interactive User Interface 130 | Communication Module 140 |

Figure 3

Reference Number:
Description:

Check Verification
◉ Require Bank Verification
○ Text Msg Verification
○ NO Verification Notification
◉ Both EMail and SMS
○ SMS Only
○ EMail Only ◉ E-Mail Check22

E-Mail Check22
Check Payee
Thomas Skala
Destination E-Mail
thomas@allcom.com

Payment request sent. The Transaction Number is: 82180

Bank Account Verification E-Mail and Text will be sent.

Send Payment Request To:

Genie Number: 9992693045

Name: Praveen Allam

FIG. 9

Dear Tom Smart:

XYZ Merchant is requesting your approval to process a payment for the amount of $1.00 which may be charged to your checking account using a GenieAPG .

Pay Genie Number:    9991234567
Name:  Tom Smart
Check Payee:   Tom Smart
Check Amount: $ 1.00
Reference Code:
Description:

When you click on the Authorize Now button below you may be asked to provide your bank's 9 digit routing number and your checking account number both which are printed on the bottom of your checks as well as your date of birth for security. This authorization also includes you logging into your bank account to verify your ownership of the account you provided. You may authorize only once.

Click the Authorize Now button to authorize this payment.

For additional information about Genie Gateway email: Genie Gateway Customer Service

Application Information

Fill in the missing information.

First Name
Tom

Last Name
Smart

SSN/TIN
000 - 00 -

Date of Birth
MM/DD/YYYY

Bank Name ⓘ

Routing (ABA) Number ⓘ
Numbers Only, Nine Digits

Account Number

☐ BY CHECKING THIS BOX, YOU APPLY FOR INSTANT BANK VERIFICATION ("IBV") AND ACCEPT THE TERMS AND CONDITIONS IN THIS AGREEMENT AND YOU AGREE, ACKNOWLEDGE AND CONSENT THAT YOUR PERSONAL INFORMATION WILL BE COLLECTED USED

☐ BY CLICKING "NEXT" I AGREE I HAVE READ AND I AGREE TO BE BOUND BY THE TERMS AND CONDITIONS IN THE AGREEMENT, INCLUDING THE PRIVACY POLICY AND THE ARBITRATION CLAUSE CONTAINED THEREIN.

Terms and Conditions

By clicking "NEXT" I agree to the terms and conditions in the agreement, including the Privacy Policy and the Arbitration Clause contained therein.

NEXT

FIG. 11

Virtual Point of Sale (VPOS) Operators

Your VPOS can provide simultaneous access, for several operators, to process payments for your goods and services. You can add, and / or manage, your operators with the buttons below. You can add a unique nick name, password, and of course first and last name, for each operator. You can send a VPOS Button (link) to the Operator for quick access.

( Create Operator )

Operators

⦿ Bentley    Bentley Woof
◯ Beta       Beta Testing
◯ Tom        Tom Smart
◯ Trudy      Trudy ( Modify ) ( Send VPOS Button ) ( Delete )

FIG. 27

Virtual Point of Sale (VPOS) Operators

Operator:         [_____] (First Name/NickName)
Full Name:        [_____]
Password:         [_____]
E-Mail Address:   [_____]

( Save )  ( Save And Send VPOS Button )

( Cancel )

Withdrawal Types
- ☑ Genie Checks
- ☐ Stop Genie Check
- ☐ CashBoxToBank (ACH Credit)
- ☐ CashBox Debit Card
- ☑ Send Payment (CashCode)
- ☐ PayBack
- ☐ Refund CashCode
- ☑ P2P(No Fee)

FIG. 33

Funding Types
- ☐ Credit Card
- ☑ Genie Check
- ☑ Bill Pay
- ☐ Mail Deposit
- ☑ Bank Deposit
- ☐ OLB Immediate Credit
- ☑ Genie Credits
- ☐ Check22
- ☐ Wire
- ☐ Pickup

FIG. 34

Operators | Order Report

If Check22
- ○ Load Check22
- ◉ E-Mail Check22

Check Verification
- ☑ Internet Bank Verification (IBV)
- ☑ Internet Customer Authorization (ICA)
- ☐ NO Verification Notification
- ☑ Send All
- ☑ SMS Only
- ☑ EMail Only
- ☐ Voice Only ☑ Request Checking Account
☑ Require Voided Check

E-Mail Check22
- Check Payee - Descriptor
- Destination E-Mail for Check
- Destination E-Mail for Payment Notification
- Additional Destination E-Mail for Payment Notification Merchant Customer Service
- Contact Phone Number
- Contact E-Mail Authorization/Verification EMail
- EMail HTML Body
- Destination URL

FIG. 37

Genie CashBox

MapleMeds.Online    Bentley - Bentley Woof    ▲ Logout

Order #13720 = $ 1.00

New Customer Information:
First Name: [Tom]    Last Name: [Scott]
Phone: [7027067900] [Cell Phone ▼]    E-Mail: [BizDev@GenieGateway.com]

Checking Account Information:
Bank ABA Routing Number: [121090358]
Bank Account No: [123456789]
Reenter Bank Account No: [123456789]

Address: [123 Main Street]
City: [Los Angeles]
State: [California ▼]
Zip: [91316]

○ Use iBV (Internet Balance Verification)    ○ Use Both E-Mail and Text Message
◉ Use iCA (Internet Check Authorization)    ○ Use Text Message Only
                                              ◉ Use E-Mail Only ☐ Get Checking Account
☐ Require Voided Check ▲ Continue    ▲ Cancel

METHOD AND SYSTEM FOR PROCESSING ON-DEMAND SUBSTITUTE CHECKS

CROSS-REFERENCE TO RELATED APPLICATIONS

This invention claims priority, under 35 U.S.C. § 120, to the U.S. Provisional Patent Application No. 62/357,864 by Thomas Skala filed on Jul. 1, 2016, which is incorporated by reference herein in its entirety.

BACKGROUND OF THE INVENTION

Field of the Invention

The present invention relates to payment systems and methods, specifically to online payment systems and methods.

Description of the Related Art

Since commerce was established, people have been paying (payor(s)) others (payee(s)) money and other forms of consideration. This type of transaction is central to modern commerce and allows for a great variety of human interactions and relationships, such as but not limited to: buying/selling goods, renting property, the offer of services, buying/selling intangible properties (e.g. stocks, intellectual property), and the like.

There are many modern options and methods for a payor to issue payment to a payee. There are several forms of credit that may be used by a payor to issue payment to a payee, such as but not limited to credit cards, simple notes, IOUs, and the like. In other cases payments are issued through cash, in-kind payments (e.g. produce, livestock), barter, and other items of "actual value."

Additionally, payors may issue payments from accounts where they have money deposited with a financial institution (e.g. checking/saving accounts) and this may be done in various ways. In one manner, a payee is authorized by the account holder to draw money from the account, i.e. to pull the money out, and this may be done according to a payment schedule. In another method, a payor may issue a check which the payee then converts to value at their own financial institution, generally depositing or cashing the check.

Such payments may be made in-person or over various communication devices and will often reference invoices that have been issued by the merchant. Such invoices are often recorded within the payor's accounting system so that the payment thereof may be tracked.

The inventions heretofore known suffer from a number of disadvantages which include requiring too many steps, requiring too many operations from a user/payer, putting the recipient at financial risk in accepting payment, requiring non-traditional payment formats to be accepted, requiring the payee to have an account in a specialized or non-traditional system, taking too long to effect payment, paying through a credit account, not being on-demand, requiring multiple APIs/sources/platforms/cloud services, being slow, being inefficient, being difficult to use, giving payee(s) too much freedom/power/access to a bank account, being too expensive, not being integrated with other systems, failing to provide privacy, not being safe, being slow, not being secure, and the like and combinations thereof.

What is needed is a method and/or system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available payment methods and systems. Accordingly, the present invention has been developed to provide a payment method and/or system.

According to one embodiment of the invention, there is a method of processing a payment over a computerized network. The method may include one or more of the steps of: providing, to a user through a display device, an active payment icon that may be associated with a particular payment obligation, wherein the active payment icon may include a link to a payment interface and/or may include machine-readable information regarding the specific payment to be made; on selection of the user selectable link, providing the payment interface whereon payment of the particular payment obligation can be satisfied by the user and/or displaying, through the payment interface, the machine-readable information; displaying to the user over the display device and/or through the payment interface, an interactive user interface that may allow the user to satisfy the particular payment obligation; and/or processing satisfaction of the particular payment obligation through the payment interface.

It may be that the active payment icon also displays a phone number uniquely associated within the payment interface with the particular payment obligation to an automated payment receipt system in functional communication with the payment interface whereat payment of the particular payment obligation may be satisfied. It may be that the machine-readable information includes one or more of an invoice number, an amount to be paid, a payee name, payor name, description of payment obligation, amount of the payment obligation, a due date, a merchant's account number, a reference number, a verification option, and/or an email address.

It may be that the active payment icon is associated with a non-bank e-wallet account which uses a phone number as the account number.

It may be that the first time a user interacts with the payment interface, they are required to enter contact and payment information, which is stored by the payment interface in association with an identification string, and subsequent times that same user interacts with the payment interface they are only required to enter the identification string associated with their contact and payment information.

It may be that the step(s) include creating a substitute check to effect payment of the particular payment obligation and/or that the step of creating a substitute check is dependent on successfully automatically verifying the payee through one or more databases wherein positive and/or negative information about payees is reported against a history standard and automatically performing a velocity test on a payee account from which the substitute check is to be created as compared to a predefined standard of transaction timing and amounts.

According to another non-limiting embodiment, there is a computerized payment interface operating over a computerized network. The computerized payment interface may include one or more of: an icon generating module that automatically generates active payment icons associated with particular payment obligations, wherein the active payment icons each include a link to the computerized payment interface and includes machine-readable information regarding the specific payment to be made; a payment processing system; and/or an interactive user interface functionally coupled to the payment processing system and that is activated on selection of an active payment icon such that machine-readable information regarding the specific payment is displayed together with interactive user interface tools for effecting payment thereof through the payment processing system.

It may be that the payment processing system is a non-bank e-wallet account which uses a phone number as the account number and/or that the payment processing system generates substitute checks associated with a payor of a particular payment obligation written out to the payee of the particular payment obligation.

It may be that the icon generating module automatically generates active payment icons having alternative programming associated with a plurality of utilization modes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 3 is a module diagram showing a system for processing a payment over a computerized network, according to one embodiment of the invention;

FIG. 6 is a screenshot of a user interface showing selectable and user enterable options for receiving a payment for a particular payment obligation, according to one embodiment of the invention;

Figures 7, 8:
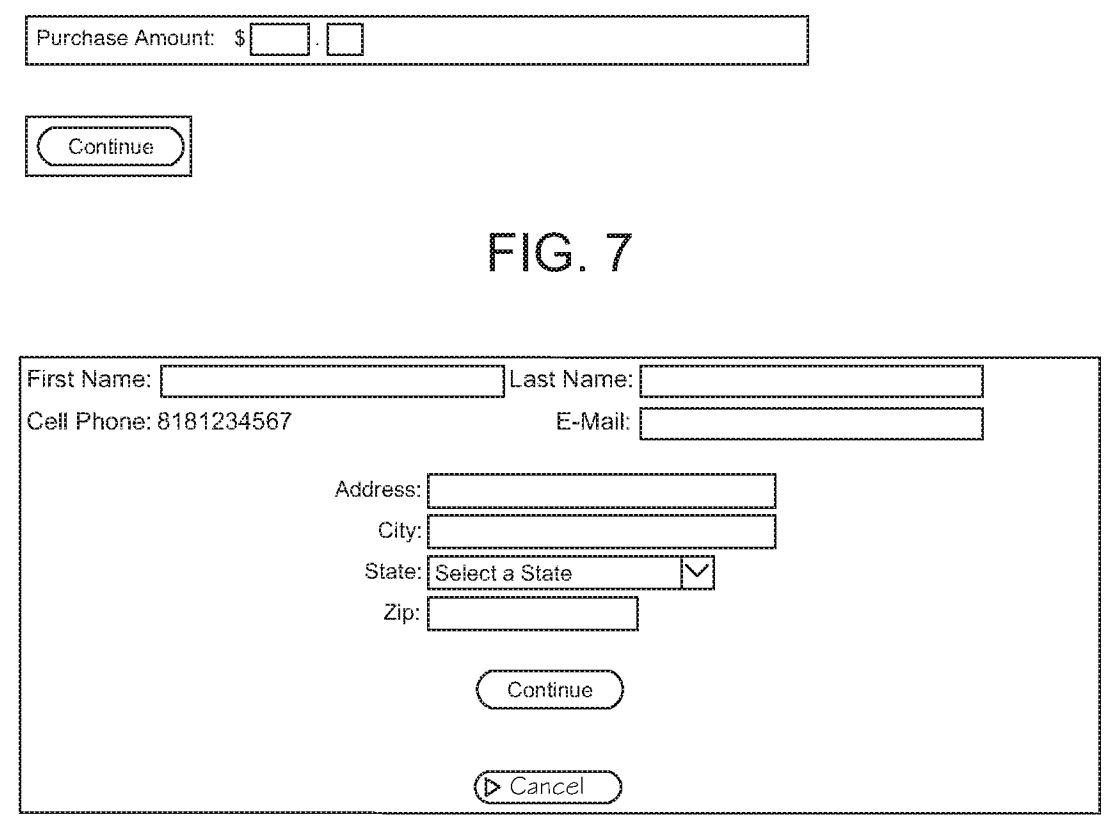

FIG. 7 is a screenshot of a user enterable purchase amount field, according to one embodiment of the invention;

FIG. 8 is a screenshot of a user interface for collecting contact information from a first-time user, according to one embodiment of the invention;

FIG. 9 is a screenshot of a payment request conformation, according to one embodiment of the invention;

FIG. 10 is a sample email requesting payment authorization from a payor, according to one embodiment of the invention;

FIG. 11 is a screenshot of an applicant information user interface to apply for bank verification, according to one embodiment of the invention;

FIG. 27 is a screenshot of a VPOS operator selection screen, according to one embodiment of the invention;

FIG. 28 is a screenshot of a wizard for adding a VPOS operator, according to one embodiment of the invention;

FIG. 29 is a screenshot of a web page wherein an operator may process a payment, according to one embodiment of the invention;

FIG. 30 is a screenshot of a screen provided to an operator when a returning payor is recognized by the system, according to one embodiment of the invention;

FIGS. 32-36 are screenshots of merchant management panels showing selectable merchant options within a payment interface, according to one embodiment of the invention;

FIG. 37 is a screenshot of a customer (payor) information screen which enables an operator or other user to enter a new customer/payor into a payment interface, according to one embodiment of the invention;

DETAILED DESCRIPTION OF THE INVENTION

Figure 1:
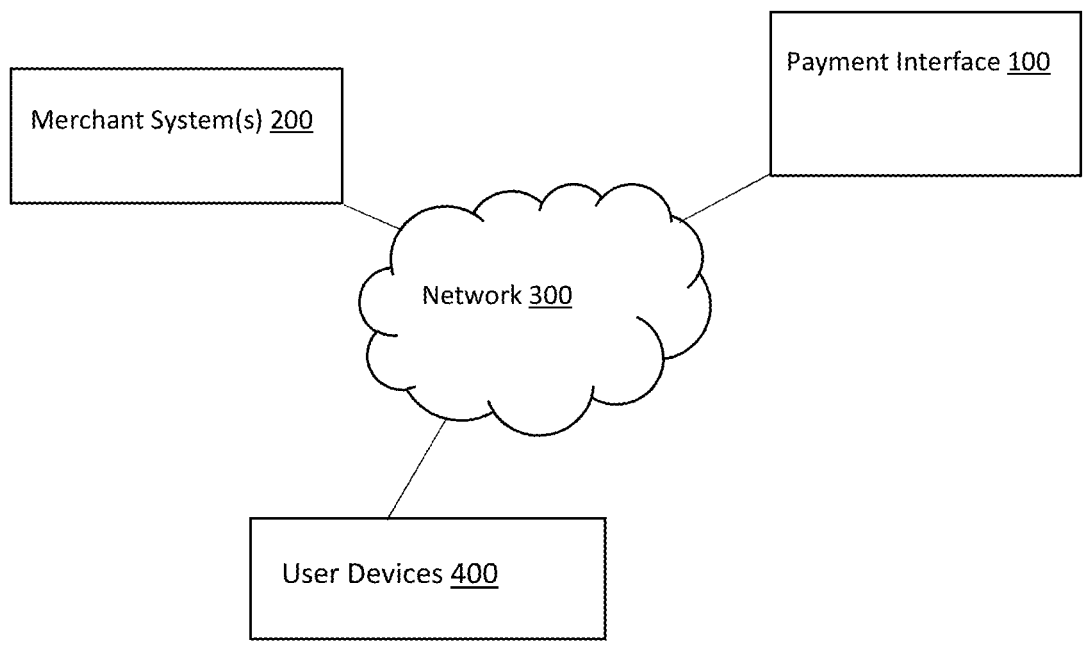
FIG. 1 is a network diagram illustrating a payment interface, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Andriod, iOS, BSD, IBM z/OS, Windows Phone, Windows CE, Palm OS, Windows Vista, NT, 95/98/2000, OS X, OS2; QNX, UNIX; GNU/Linux, Solaris; MacOS, and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention(s). Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Reference throughout this specification to features, advantages, or similar language does not imply that all of the features and advantages that may be realized with the present invention(s) should be or are in any single embodiment of the invention(s). Rather, language referring to the features and advantages is understood to mean that a specific feature, advantage, or characteristic described in connection with an embodiment is included in at least one embodiment of the present invention(s). Thus, discussion of the features and advantages, and similar language, throughout this specification may, but do not necessarily, refer to the same embodiment.

Furthermore, the described features, advantages, and characteristics of the invention(s) may be combined in any suitable manner in one or more embodiments. One skilled in the relevant art will recognize that the invention(s) can be practiced without one or more of the specific features or advantages of a particular embodiment. In other instances, additional features and advantages may be recognized in certain embodiments that may not be present in all embodiments of the invention(s).

The following and/or accompanying disclosure information is provided as non-limiting examples of features, functions, structures, associations, connections, methods, steps, benefits, consequences, and the like that may be included independently, in any open combination, and in any limited combinational form (consisting of) despite any language to the contrary, such as but not limited to "must" "always" "never" "certainly" and the like. Any dimensions provided are exemplary and functionally equivalent ranges that one skilled in the art would recognize after reading this disclosure are implied. Disclosure provided may be prophetic, even if asserted as otherwise.

These features and advantages of the present invention(s) will become more fully apparent from the following description or may be learned by the practice of the invention(s) as set forth hereinafter.

FIG. 1 is a network diagram illustrating a payment interface, according to one embodiment of the invention. There is shown a network 300 in functional communication with each of a plurality of user devices 400, merchant system(s) 200, and a payment interface 100 according to one embodiment of the invention.

The illustrated network 300 provides communication amongst and between the other illustrated portions (i.e. the plurality of user devices, merchant system(s), and payment interface). Such a network may include a plurality of connected networks, such as but not limited to the internet, various intranets public and/or private, and the like and combinations thereof. The illustrated portions may be distributed across various nodes of the network and/or may be able to communicate thereby. Each may have its own communication module that allows for communication over the network and may have an address by which other portions may communicate therewith.

The illustrated merchant system(s) 200 are systems that merchants use to operate their businesses. Such may include, but is not limited to, POS systems, accounting systems, invoicing systems, payment receipt systems, credit card processing systems, check cashing systems, online-shopping carts, sales funnel systems, marketing systems, and the like and combinations thereof. Of particular interest are merchant systems which generate invoices, orders, payment tickets, or other records of payment obligations. Such systems generally include records of identifying information of payor, contact information of payor, obligation amount, date of obligation, date obligation due, payment types accepted, description of obligation (e.g. services provided, quantity ordered), and/or payment terms. Such information is sometimes stored in a machine-readable format (e.g. as a record in a database), but such formats are proprietary and not generally usable outside such systems without custom programming.

The illustrated user devices 400 may include any devices used by users to communicate with computerized systems over the network, including but not limited to desktop computers, slave terminals, mobile phones, tablets, smart TVs, and the like and combinations thereof. The devices will generally include some sort of user interface, such as but not limited to a network browser that allows them to view, send and receive information over the network and interact therewith.

The illustrated payment interface 100 may include any one or more of the features, functions, modules, systems, operations, and the like described herein. Generally, it permits simple and easy satisfaction (e.g. payment) of a particular payment obligation using an active icon which is displayed to the user and is associated within the payment interface with the particular payment obligation such that activation of the active icon triggers a payment receipt process therewith that makes it easy and simple for the user to satisfy the payment obligation.

In operation, a merchant may, either automatically through connection of the merchant system(s) with the payment interface, or manually through a merchant user interface within the payment interface, request creation of an active icon associated with a particular payment obligation due to the merchant. The payment interface creates the icon, including creating the appropriate associations therewith and provides the icon to the merchant and/or to the payor who owes he obligation. The merchant may deliver the icon to the payor, such as but not limited to by sending an email with an invoice and the icon embedded therewith. The payor may activate the icon, such as but not limited to by simply clicking the icon. Once activate, the icon triggers a payment process which allows for the payor to simply and easily satisfy the payment obligation, such as but not limited to by generating a substitute check from the payor's checking account or from a non-bank e-wallet account, which may be automatically sent electronically over the network to the merchant, whose system may cash the check.

Advantageously, the process of satisfying the payment obligation is made much more simple and easy for all parties. What may have previously taken days or weeks to effect payment, may only take a few moments. Accordingly, merchants may be paid much sooner. Payors may be able to pay without having to leave home to mail checks or having to fill out forms or otherwise duplicate information associated with the payment obligation. Further, the process provides enhanced security and safety for the payor, since the merchant does not have direct access to the account(s) of the payor.

Figure 2:
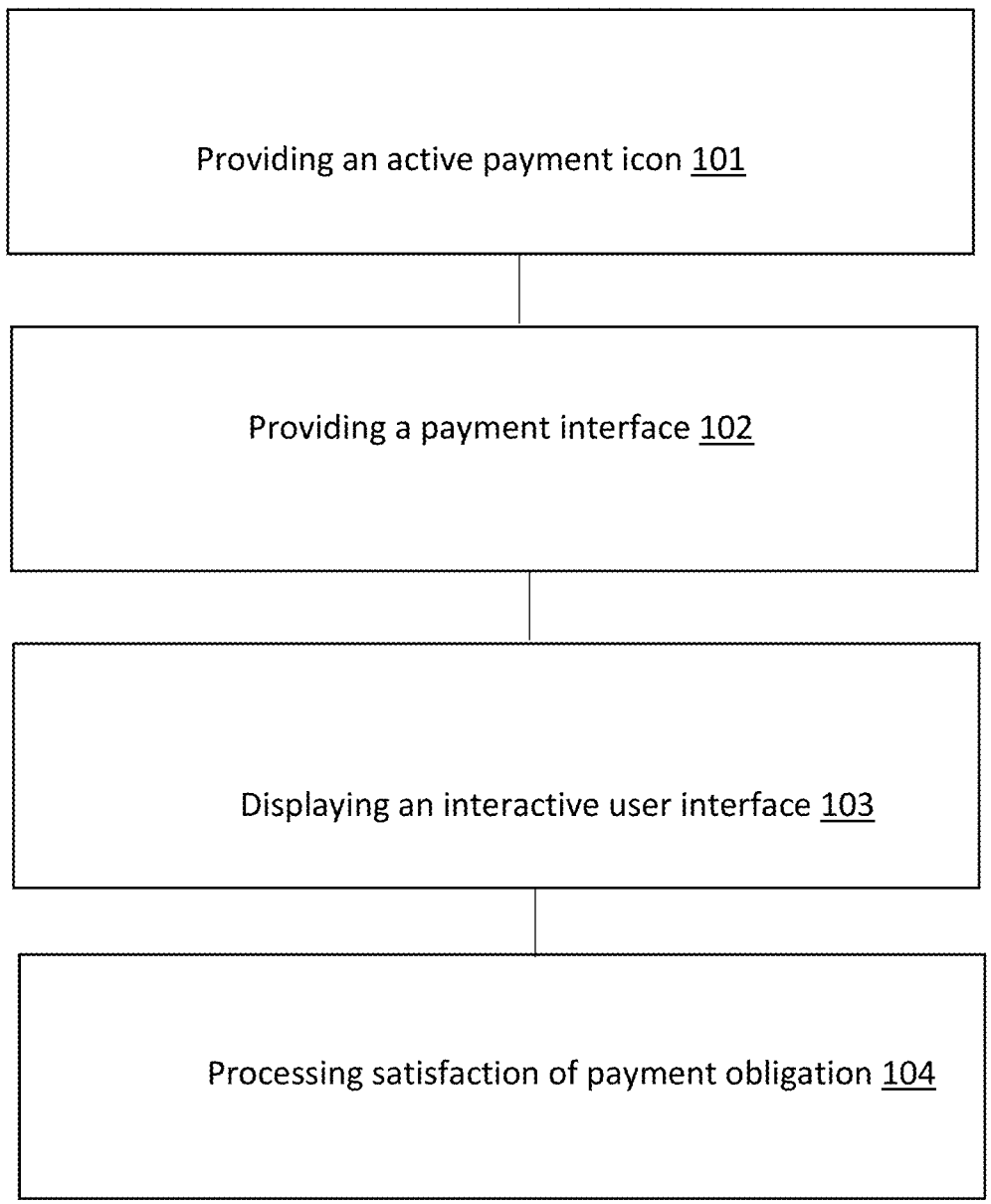
FIG. 2 is a flow chart illustrating a method of processing a payment over a computerized network, according to one embodiment of the invention.
Figure 4:
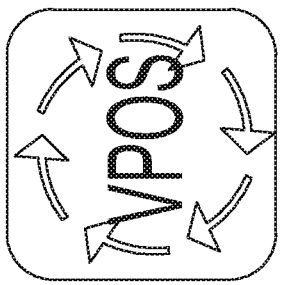
FIG. 4 is an exemplary active icon, according to one embodiment of the invention.
Figure 5:
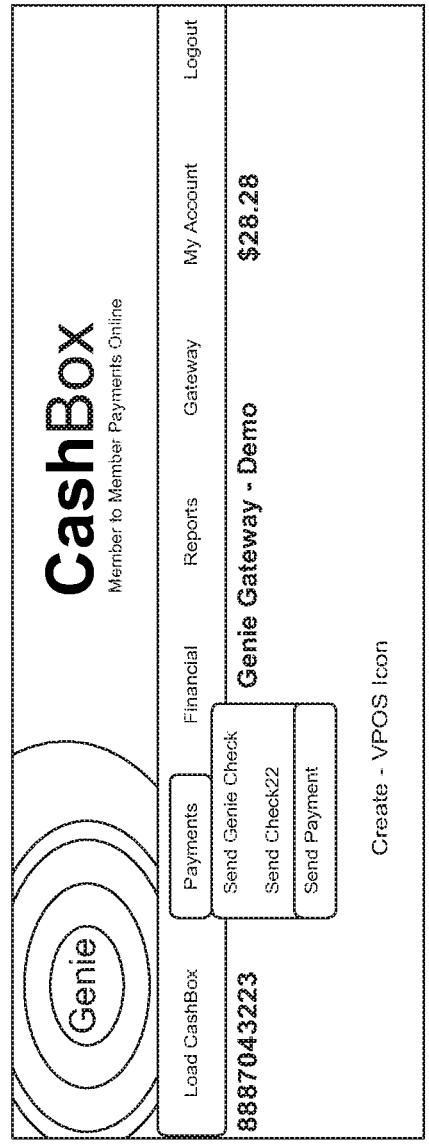
FIG. 5 is a screenshot of a cashbox user interface of a non-bank e-wallet system showing a selectable send payment option, according to one embodiment of the invention.
Figure 12:
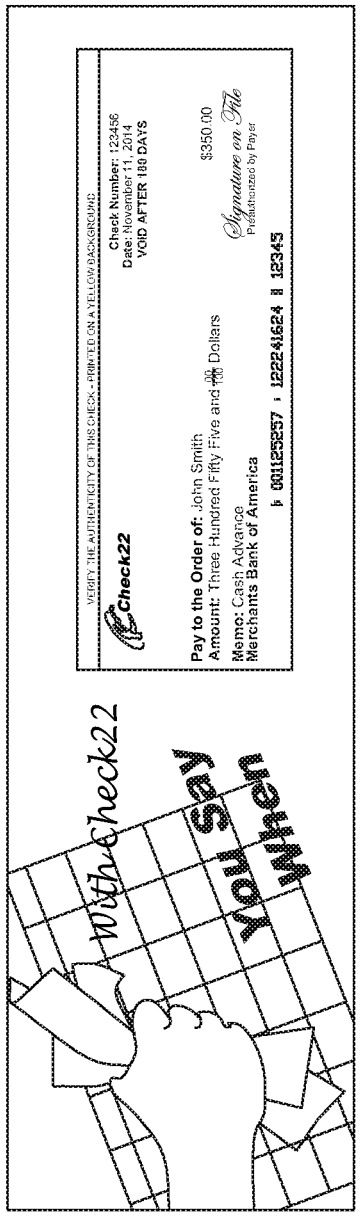
FIG. 12 is an image showing an exemplary substitute check, according to one embodiment of the invention.

FIG. 2 is a flow chart illustrating a method of processing a payment over a computerized network, according to one embodiment of the invention. There is shown a method having the steps of providing an active payment icon 101, providing a payment interface 102, displaying an interactive user interface 103, and processing satisfaction of a payment obligation 104.

The step of providing an active payment icon 101 may include providing an active payment icon that may be associated with a particular payment obligation. Further, the active payment icon may include a link to a payment interface and/or may include machine-readable information regarding the specific payment to be made.

An active payment icon is a visual indicator on a display that is selectable and/or actuatable in some manner such that on selection/actuation payment obligation information associated with that particular active payment icon is used to provide a payment interface and/or an interactive user interface that is customized to the particular payment obligation associated therewith.

Figures 14, 15:
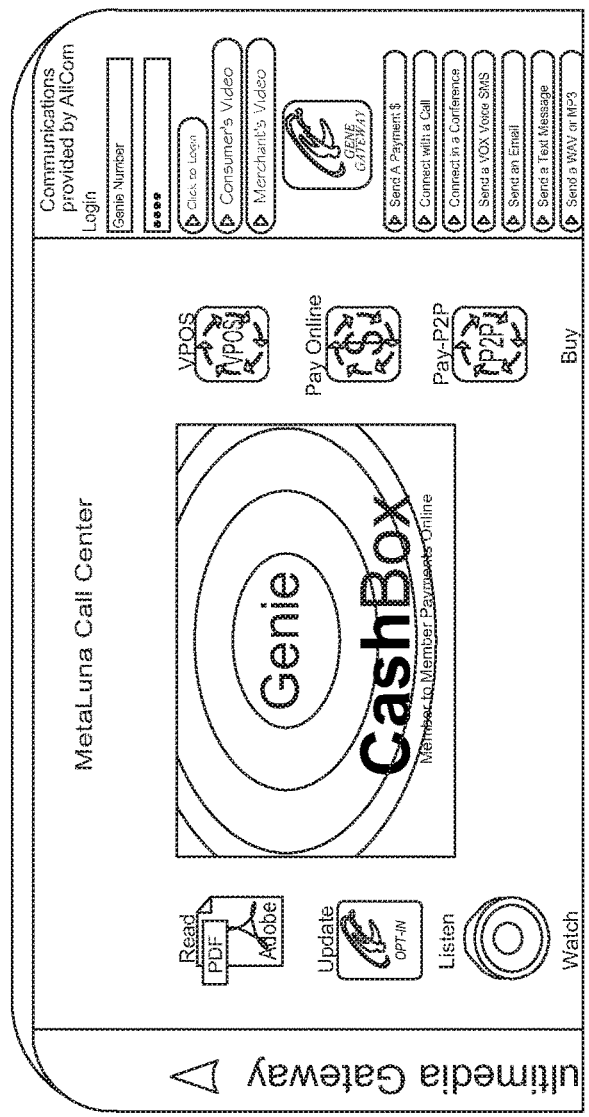
FIG. 14 is a screenshot of a cashbox configuration user interface of a non-bank e-wallet system showing a selectable send payment option, according to one embodiment of the invention.
FIG. 15 is a screenshot of an exemplary home page of a call center, according to one embodiment of the invention.
Figure 16:
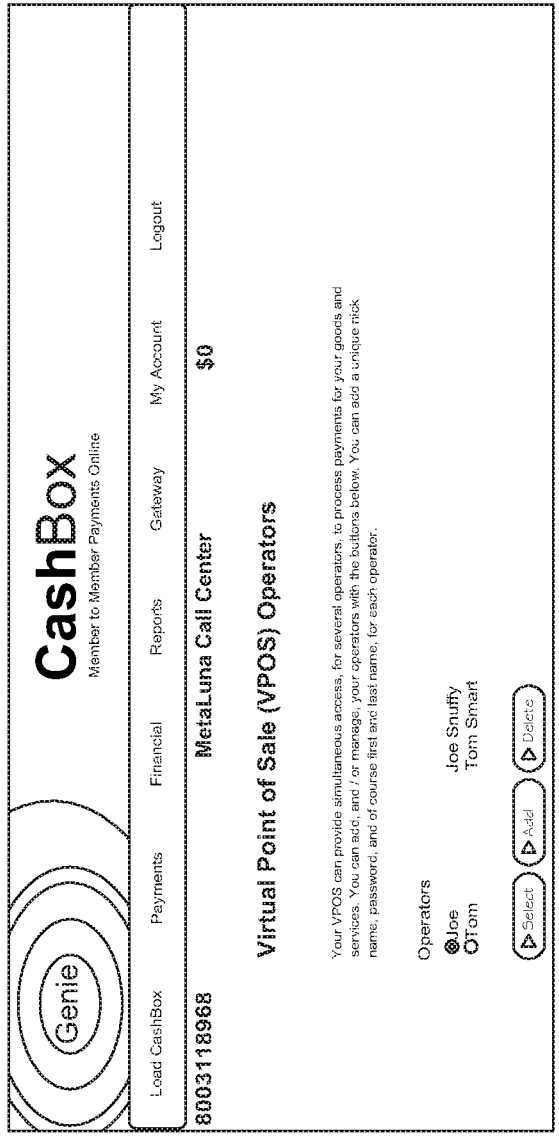
FIG. 16 is a screenshot of an operator selection screen of a call center, according to one embodiment of the invention.
Figure 17:
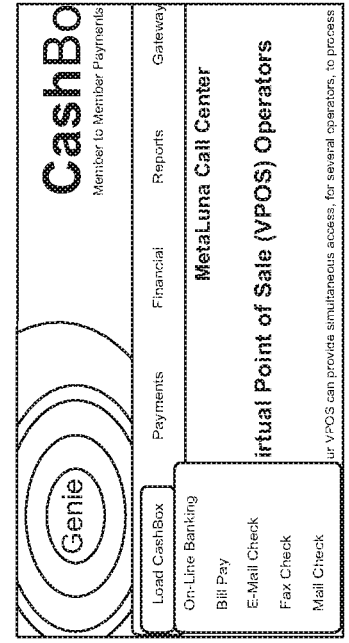
FIG. 17 is a screenshot of a call center load cashbox screen, according to one embodiment of the invention.
Figure 18:
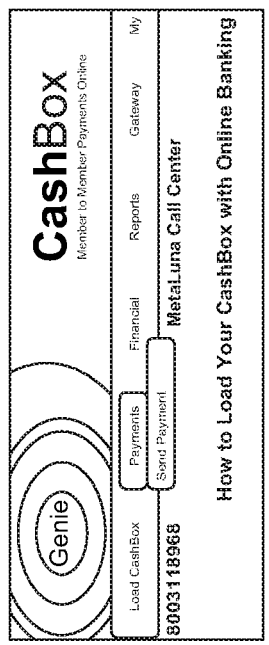
FIG. 18 is a screenshot of a call center send payment screen, according to one embodiment of the invention.
Figure 19:
FIG. 19 is a screenshot of a payment information entry screen for a call center, according to one embodiment of the invention.
Figure 20:
FIG. 20 is a screenshot of a payment account entry screen for a call center, according to one embodiment of the invention.

The step of providing an active payment icon may include providing a merchant interface wherein such an icon may be generated. The merchant interface may include a plurality of user settings (See FIGS. 6 and 14 for examples) that modify properties of icons generated by the system and/or how they may operate and/or how the system may operate subsequent to the activation of the same.

In its simplest form, an active payment icon includes a graphic that is associated with programming that allows for the activation of the graphic (e.g. by clicking, double clicking, drag-dropping, pressing through a touch screen, highlighting and entering) to trigger activation of a payment interface and/or an interactive user interface that is customized to a particular payment obligation. As a non-limiting example, such an active icon may simply trigger a message to be sent to a payment interface that includes an invoice number or other string for identifying a particular payment obligation recorded therewith and an IP address to send the associated user interface to.

An active icon may also display a phone number where a user may call in to make a payment on the particular payment obligation. It may be that the phone number is unique to the payment obligation, and therefore when an automated system answers the call, the payor does not need to enter in any of the information related to what is being payed against. Providing the active icon may also include generating such a unique number and creating a graphic that displays that number. The system may return such a number to a pool of available numbers to be used once the payment obligation is satisfied or may associate that number with a particular customer for future payment obligations for the convenience of the payor.

Accordingly, an active icon may be automatically generated which includes custom graphics, one or more records of information related to a particular payment obligation, scripting that allows for selection/activation of the icon within the user interface on which it is displayed, and one or more commands which may be delivered to a payment interface on selection/activation of the icon. Selecting/activating the icon triggers the commands which then return with a custom interface through which payment may be effectuated.

The step of providing a payment interface 102 may occur on selection of a user selectable link, such as that provided by the active payment icon. The payment interface may be customized such that payment of the particular payment obligation can be satisfied by the user and/or displaying, through the payment interface, the machine-readable information. The payment interface is different from the interactive user interface in that the payment interface is able to interface with one or more financial institutions to effect transactions, while the interactive user interface interfaces with the user/payor in order to receive instructions therefrom, which are carried out by the payment interface.

A payment interface may include one or more of the following software/hardware instructions for: communicating between one or more automated systems of financial institutions, generating substitute checks, transmitting electronic payments, charging credit/charge cards, charging debit cards, automatic funds transfers, SWIFT account transfers, direct debit (pre-authorized debit), cheque and money order creation, and the like and combinations thereof. Such instructions may include instructions for authorization, verification, batching, clearing, settlement, funding, chargebacks, and the like and combinations thereof. Such may include instructions for communicating between bank accounts, non-bank e-wallet accounts, credit card accounts, brokerage accounts, and the like and combinations thereof.

The step of displaying an interactive user interface 103 may occur on selection of a user selectable link, such as that provided by the active payment icon. The displayed user interface may be and/or may be incorporated into a subcomponent/module of the payment interface and/or may be separate therefrom. The interactive user interface is different from the payment interface in that the interactive user interface is able to interface with one or more payors to receive transaction instructions, while the payment interface interfaces with one or more financial institutions in order to effect payments/transactions. Non-limiting examples of such a user interface are shown in FIGS. 5, 7-11 and 13.

At its simplest, the interactive user interface will display information about the payment obligation and include user fillable/selectable fields/buttons where an intention to satisfy the obligation may be shown to the system. On such a show of intention, the payment interface may send instructions in accordance with the instructions from the user to make such payments as directed.

The step of processing satisfaction of a payment obligation 104 may be accomplished by making/initiating one or more transactions under instructions received from the payor through the interactive user interface. As a non-limiting example, wherein a payor chooses to pay through a Check22 system (See, for example, the payment system and method taught in U.S. patent application Ser. No. 14/848,025 by Skala, filed on 8 Sep. 2015, which is incorporated herein in its entirety) through the GenieAPG (e.g. Genie Cashbox), the payment interface may generate a substitute electronic check including information associated with the payment obligation (e.g. amount, invoice number), and then may transmit the electronic substitute check to the payee/merchant, whose own system may process the same, therefore effecting rapid and convenient payment and receipt of payment by and for both payor and payee.

According to one embodiment of the invention, there is a method of processing a payment over a computerized network. The method may include one or more of the steps of: providing, to a user through a display device, an active payment icon that may be associated with a particular payment obligation, wherein the active payment icon may include a link to a payment interface and/or may include machine-readable information regarding the specific payment to be made; on selection of the user selectable link, providing the payment interface whereon payment of the particular payment obligation can be satisfied by the user and/or displaying, through the payment interface, the machine-readable information; displaying to the user over the display device and/or through the payment interface, an interactive user interface that may allow the user to satisfy the particular payment obligation; and/or processing satisfaction of the particular payment obligation through the payment interface.

It may be that the active payment icon also displays a phone number uniquely associated within the payment interface with the particular payment obligation to an automated payment receipt system in functional communication with the payment interface whereat payment of the particular payment obligation may be satisfied. It may be that the machine-readable information includes one or more of an invoice number, an amount to be paid, a payee name, payor name, description of payment obligation, amount of the payment obligation, a due date, a merchant's account number, a reference number, a verification option, and/or an email address.

It may be that the active payment icon is associated with a non-bank e-wallet account which uses a phone number as the account number, such as but not limited to a UPN of a Genie CashBox system.

It may be that the first time a user interacts with the payment interface, they are required to enter contact and payment information, which is stored by a data storage module of the payment interface in association with an identification string, and subsequent times that same user interacts with the payment interface they are only required to enter the identification string associated with their contact and payment information.

It may be that the step(s) include creating a substitute check to effect payment of the particular payment obligation and/or that the step of creating a substitute check is dependent on successfully automatically verifying the payee through one or more databases wherein positive and/or negative information about payees is reported against a history standard and automatically performing a velocity test on a payee account from which the substitute check is to be created as compared to a predefined standard of transaction timing and amounts.

FIG. 3 is a module diagram showing a system for processing a payment over a computerized network, according to one embodiment of the invention. There is shown a computerized payment interface 100 including an icon generating module 110, a payment processing system 120, an interactive user interface 130, and a communication module 140.

The illustrated computerized payment interface 100 operates over a computerized network and one or more of the functions/modules/operations described herein associated therewith may be performed by a processor executing machine readable instructions. The modules, systems and interfaces described herein are in functional communication with each other sufficient to perform the functions described. The computerized payment interface may operate on one or more servers that are remote from user devices and may communicate with the same over one or more networks. The computerized payment interface is in functional communication with one or more automated systems of financial institutions sufficient to effect transactions therewith. As a non-limiting example, such a payment interface may be in communication with one or more of: checking account system(s) of bank(s), charge processing systems for credit cards, transaction management systems for non-bank e-wallet accounts (e.g. Genie CashBox, Bitcoin), and the like and combinations thereof.

The illustrated icon generating module 110 may include a wizard/module/function for use by a merchant user and/or a merchant system for generating active icons associated with particular payment obligations (e.g. particular invoices, purchase orders). The wizard/module/function may take as input information about the payment obligation, including but not limited to amount, payor information, payee information, payment type requested/allowed, due date, invoice/order date, email address(es) associated with the obligation, and the like and combinations thereof. The icon generating module may create one or more records stored in the payment interface which may associate with the icon created, such as but not limited to by including as a record ID an identification string included with the icon code. The icon generating module may also include software/hardware instructions for generating a graphic to be included with the icon code, such as but not limited to generating a graphical display of a telephone number to be displayed, which number may be used as an interface to effect payment instructions.

The illustrated payment processing system 120 effects payment instructions by transmitting transaction instructions to one or more financial institutions. Such instructions may be transmitted electronically (e.g. emailing a substitute electronic check, transmitting SWIFT/ACH/Debit instructions) or may be transmitted non-electronically (e.g. mailing an automatically printed check or letter with instructions to a financial institution/broker). The payment processing system may be one or more utilized by AllCom, such as but not limited to the GenieCashBox and Check22 systems.

The illustrated interactive user interface 130 provides a user interface through which the user may send payment instructions to be carried out. Such may be through one or more web forms, mobile applications, automated telephone systems, and the like and combinations thereof.

The illustrated communication module 140 in communication with the modules/systems/interfaces described herein to the degree useful in facilitating communications among the same. The communication module 140 is configured to provide communication capabilities to the modules/systems/interfaces described herein and to and within the computerized payment interface 100 (e.g. between the computerized payment interface 100 and the user devices and merchant systems of FIG. 1). Such communication may be wired and/or wireless, especially in regards to communications over a network, and/or may be wired and/or over a bus, such as may generally be found within a portable communication device. Such may include one or more network adapter cards, hubs, routers and the like and the operational libraries therewith. The communication module may also be configured to provide a secure method of communication over a network. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supporting herein.

Further, data may be stored within the interface and/or its components using one or more data storage modules. Data storage modules may be/include databases or data files, and may be/include memory storage device such as but not limited to hard drives, CDROM, DVDROM, flash drives, or tapes. A non-limiting example of a data base is Filemaker Pro 11, manufactured by Filemaker Inc., 5261 Patrick Henry Dr., Santa Clara, Calif., 95054. Non-limiting examples of a storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

According to another non-limiting embodiment, there is a computerized payment interface operating over a computerized network. The computerized payment interface may include one or more of: an icon generating module that automatically generates active payment icons associated with particular payment obligations, wherein the active payment icons each include a link to the computerized payment interface and includes machine-readable information regarding the specific payment to be made; a payment processing system; and/or an interactive user interface functionally coupled to the payment processing system and that is activated on selection of an active payment icon such that machine-readable information regarding the specific payment is displayed together with interactive user interface tools for effecting payment thereof through the payment processing system.

It may be that the payment processing system is a non-bank e-wallet account which uses a phone number as the account number and/or that the payment processing system generates substitute checks associated with a payor of a particular payment obligation written out to the payee of the particular payment obligation.

It may be that the icon generating module automatically generates active payment icons having alternative programming associated with a plurality of utilization modes.

Looking to FIGS. 4-23, there is shown a variety of prophetic and exemplary embodiments of the invention and they will be discussed through the following: According to one embodiment of the invention, there is a GenieAPG Accounts Payable Gateway (GenieAPG or Check22/Check 22) system/method which may include a new proprietary suite of digital solutions designed as an extension to the GenieAPG patents and to leverage several of Genie Gateway's existing inventions in order to change the collection, payment and settlement activities of lenders, merchants, commercial enterprises and service providers from the traditional grab/pull model to a new, friendlier and more acceptable method, the "push model". All Genie and/or Check22 related services/features/etc. described herein reference those provided by AllCom of 4570 South Eastern Avenue, Suite 23-221, Las Vegas Nev., 89119, which services are incorporated by reference herein for their supporting teachings.

The GenieAPG may be viewed as moving to a model where we as an individual or B2B consumers may utilize a one click method to pay all our bills, in minutes, on the telephone, cable TV, Cell Phone APP, or any internet enabled device, instead of the traditional ways of sending a payment: In short, a Gateway to manage our Accounts Payable.

The GenieAPG system/method/service may tightly integrate the GenieChecking system for creating on-demand checking instruments with the CashBox P2P payments (peer-to-peer or person-to-person payments, See FIG. 5) and many newly created management and organizational facilities into a single, integrated Application Programming Interface (API), to solve several serious problems which currently plague merchants' collection efforts and provide them with the ability to receive real-time payments, while giving their customers several new options for paying their obligations, without incurring the traditional inconvenience and costs, and without sharing their financial information with anyone.

The GenieAPG system/method/service may be an interactive multipoint API, combining a suite of digital solutions, which may fully integrate the services and database of a subscribing merchant/lender with Genie Gateway's Genie CashBox, while giving individual subscribers the ability to create on-demand P2P Payments and/or checking instruments accessing their CashBox or off-platform DDA checking accounts, by utilizing the one click GenieAPG features to send their payments.

Through specific and selectable combinations of these features, GenieAPG and the Check 22 APG may be tailored to suit the needs of three distinct communities of users:

Merchants and Lenders—Businesses and individuals engaged in the selling of goods and services, including financial services.

Agents—Sellers of communications and financial processing services to Merchants

Consumers and borrowers

This elegant solution may deliver these services with a single API, from a single source, on a single platform, in a single cloud. The unique approach in this invention may be that information moves from process to process on the same platform, rather than from system to system—or even from provider to provider. This approach delivers faster, more tightly integrated services with security, privacy, and/or safety, and/or at a lower cost than any multi-platform competitors.

The target system for the support and integration tools of the GenieAPG API and GenieAPG may be Genie Gateway's Genie CashBox, a unique e-wallet which uses a phone number (UPN) as the account number, and does one or more of:

store value and maintain a balance send and receive peer-to-peer payments in real-time create GenieChecks and GenieAPG on demand substitute checks online which may be used to making payments to anyone online, withdraw funds by depositing them in any bank account email GenieChecks and GenieAPG on demand substitute checks to merchants, lenders and other recipients anywhere integrate with a Genie CashBox debit card enabling user to access their Genie CashBox funds through ATMs and anywhere the subject debit card may be accepted.

The Genie CashBox may be a robust e-wallet with debit card and checking features which operates as one unified solution. The invention revolves around the single-platform integration of the features listed above, and particularly the new GenieAPG, and the special loading and use one or more of the features:

cash checks bill pay retail and online establishments.

GenieAPG and the Genie CashBox may be designed to be accessed from any one or more of:

internet enabled device touch tone telephone

Automated Teller Machine brick and mortar establishments online merchant cable TV.

Finally, GenieAPG may be designed to fundamentally alter the merchant/consumer relationship as it exists today, by moving purchase and other financial transactions from a "pull" model, wherein a consumer gives a merchant detailed information allowing the merchant to draw money from a consumer's accounts, to a "push" model, where the consumer provides no such information to the merchant, but instead actively sends their payments directly to the merchant in the form of a GenieAPG on demand substitute check.

The GenieAPG API may specifically extend this model into tightly controlled yet flexible integration with associating a customer's existing off-platform DDA checking account with their Genie CashBox and a merchant's commerce and their payment systems.

One of the elements of the Check 22 APG may be the APG VPOS Icon (See FIG. 4) which is an active icon having scripted behavior when selected which scripts may be automatically generated by the system. This proprietary combination of graphic device and programming code may be designed to provide a direct link from merchant invoices, statements of account, and other bill presentations (the customer's "Account Payable") and the GenieAPG VPOS system through which the customer may render payment.

Participating merchants may use the GenieAPG VPOS system to create these icons (See FIGS. 6 and 7 for an example of a pair of forms filled out in the process of generating such an icon) and then attach them, through a simple cut and paste process to their electronically presented billings, including emails, word processing documents, spreadsheets and many other forms.

VPOS Icons may be intended to create a one click solution for customers wishing to make a payment, and to eliminate the labor (and errors) of entering lots of information which we already have in our database. VPOS Icons and their embedded programming may encapsulate the merchant's Genie Number, a reference number for the memo field, the verification option, and where to email their GenieAPG.

Each merchant may be able to create a GenieAPG—APG VPOS Icon anytime, by logging into their CashBox, and clicking on the Create—VPOS Icon option, in the Payments tab (please see below). The VPOS Icons may be dynamically created with the intent of processing a payment for a specific invoice, enabling the customer wishing to make a payment to access the merchant's VPOS with one click, while skipping the requirements of re-entering the invoice number (memo field on the GenieAPG), or any of the merchant information.

Figure 13:
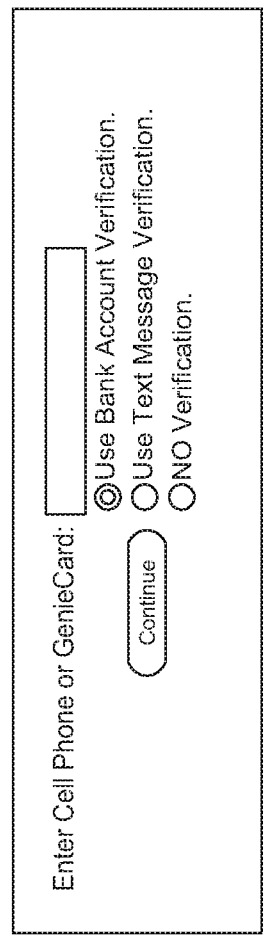
FIG. 13 is a screenshot of a user interface for a returning user that collects a unique string therefrom, according to one embodiment of the invention.

The first time customer (payor) may be required to enter their name, cell number, email address, and the amount they wish to pay, bank routing number, and DDA number (See FIG. 8 for an example form for first time customers), while returning customers may only be required to enter their cell or Genie Number, and the amount they wish to pay (See FIG. 13). After payment, a verification notice may be provided to the payor (See FIG. 9).

Each VPOS Icon may contain a unique link and/or a unique toll-free number, embedded at the time of the creation of each VPOS Icon. The VPOS Icon may provide customers with the ability to pay online or by phone. When clicking on the VPOS Icon the customer may be pointed directly to the instructions to enter the amount they wish to pay. The instructions to pay may contain the specific reference/invoice number, description, and all the options preselected by the merchant, for that specific invoice; including the choice of the verification options, the notification options, the descriptor (to whom the check is made payable), and the destination email where the payment may be sent.

The toll-free Number provides merchants with a 24×7× 365, completely automated telephone number, where they may accept payments from those customers who wish to pay by phone.

After clicking on the VPOS Icon customers wishing to make a payment may first be asked to enter their cell phone or Genie Number as if either may be recognized from a previous transaction the remaining questions may be limited to the amount they wish to pay.

First time users may be asked to provide their:
1. First and last name
2. Their email address
3. Their street address
4. Their bank account routing number
5. And finally, their checking account (DDA) number First time users may be asked to provide an identification string (e.g. UPN, phone number, account number). An approval process may also be required before processing funds, especially from a third party account. Such may be accomplished in a variety of manners, including but not limited to by a custom API adapted to integrate with a third party service, manually, through automated notifications (e.g. See FIG. 10), and the like and combinations thereof. The system may generate one or more substitute checks (See FIG. 12) at the request of the payor, which may be used to satisfy the particular payment obligation.

GenieAPG Local and National Database Monitoring

Merchants processing GenieAPG payments may have one or more of three options to verify their payments (See FIG. 11 for an exemplary screenshot of an API for application for verification) and/or may be enabled, through configuration settings in the payment interface (See FIG. 14) to be able to customize a plurality of such verification/safety settings.

Bank Account Verification with the issuing bank to verify the ownership of the specific bank account on which the GenieAPG is drawn. This verification includes the ownership of the account, and that the account is in good standing, and that there are sufficient funds in the account to cover the amount of the subject GenieAPG.

Text Message Authorization confirming with the check writer that they authorized the issuance of the subject GenieAPG. This service may not include the bank account verification service.

NO Verification, the merchant provides their customer's name, address, email address, and cell phone number, a Check 21 may be created immediately and emailed to the merchant for their processing. With this service the check writer may not contacted, permission is assumed based on the merchant's relationship with their customer. This service may not include bank account verification or text message authorization.

1. Before approving a GenieAPG Genie may verify its Local Negative Database for negative history based on Genie Number, Bank Routing and Account Number, Cell Number, and email address, any direct match may result in declining the subject GenieAPG. Genie may also confirm the Bank Routing, Account Number, and the current balance in the issuing checking account (ABC Test).

2. Once the Local Negative Database verification may be successful Genie may perform a Velocity Test based on the authorized daily, weekly, and monthly authorized number of transactions and dollar amount. GenieAPG transactions exceeding the Velocity Test limits may be declined. Velocity Test limits may be set specifically on an account by account basis.

3. Once the Velocity Test limits have been satisfied, for its final test, Genie Gateway may check the National Database into which about 95% of all U.S. banks report both positive and negative information. The National Database check may include an electronic review of one or more of the following non-limiting standards below and or standards similar thereto:

| Item Code Description | Description | Risk Level | Property Message | Decision |
|---|---|---|---|---|
| 1 | Invalid Bank Routing # | F | Invalid Bank Routing | DECLINE |
| 2 | Invalid Account # | F | Invalid Account | DECLINE |
| 3 | Customer did not pass their "ABC Test" Account Bank Confirmation | F | Invalid Account Confirmation | DECLINE |
| 4 | Customer passed their "ABC Test" Account Bank Confirmation | L | ABC Test OK | ACCEPT |

-continued

| Item Code Description | Description | Risk Level | Property Message | Decision |
|---|---|---|---|---|
| 5 | Customer has unpaid item(s) with at least one item reported as R02, R03, or R04 | H | Consumer Affairs 888-222-7621 | DECLINE |
| 6 | Customer has unpaid item(s) with at least one item reported as R05, R07, R10, R29, or R51 | H | Consumer Affairs 888-222-7621 | DECLINE |
| 7 | Customer has recent unpaid return item(s). The reason for the return is suspicious. | H | Consumer Affairs 888-222-7621 | DECLINE |
| 8 | Customer has unpaid return item(s). Returns are not recent but the return is suspicious. | H | Consumer Affairs 888-222-7621 | DECLINE |
| 9 | Customer's checking account balance is NOT sufficient to cover the amount of the GenieAPG requested. | H | Insufficient Balance | DECLINE |
| 10 | Customer's checking account balance verified and is sufficient to cover the amount of the GenieAPG requested. | L | Balance OK | ACCEPT |
| 11 | Customer has multiple unpaid items. Account is not known to be closed. | H | Consumer Affairs 888-222-7621 | DECLINE |
| 12 | Invalid DL format | F | Invalid DL format | As Applicable |
| 13 | Invalid Telephone Number | F | Invalid Telephone Number | Format Error |
| 14 | Amount exceeds limits set in rule set | R | Merchant - Over Maximum Dollar Amount | DECLINE |
| 15 | # or $ amount exceeds limits set in rule set for the last 24 hours | R | Merchant - Exceeds Day Velocity Limits | DECLINE |
| 16 | # or $ amount exceeds limits set in rule set for the window of days. | R | Merchant - Exceeds Window Velocity Limits | DECLINE |
| 17 | Check # is lower than the minimum check number allowed in the rule set | R | Merchant-Check # too low | ACCEPT |
| 18 | Duplicate transaction detected | R | Duplicate GenieAPG | DECLINE |
| 19 | Reported history of R02 (Account closed. A previously active account has been closed by action of the customer or the RDFI) | W | Risk Warning | DECLINE |
| 20 | Reported history of R03 in the last 12 months (No account/Unable to Locate Account. The account number structure is valid and it passes the check digit validation, but the account number may not correspond to the individual identified in the entry. | W | Risk Warning | DECLINE |
| 21 | Reported history of R04 in the last 12 months (Invalid account number. The account number structure is not valid. The entry may fail the check digit validation or may contain an incorrect number of digits. | W | Risk Warning | DECLINE |
| 22 | Reported history of R05 in the last 12 months (Unauthorized Debit to Consumer Account Using Corporate SEC Code (adjustment entries). | W | Risk Warning | DECLINE |
| 23 | Reported history of R07 in the last 12 months (Authorization revoked. The customer revoked the authorization previously provided to this ODFI for this transaction. | W | Risk Warning | DECLINE |
| 24 | Reported history of R10 in the last 12 months (No authorization. Customer has notified the bank that this payment is not authorized to your company. | W | Risk Warning | DECLINE |
| 25 | Reported history of R29 in the last 12 months (Corporate customer advises not authorized. RDFI has been notified by the Receiver that the Originator of a given transaction has not been authorized to debit the Receiver's account. | W | Risk Warning | DECLINE |
| 26 | Reported history of R51 in the last 12 months (Ineligible item. Item is Ineligible, Notice Not Provided, Signature Not Genuine, Item Altered, or Amount of Entry, Not Accurately Obtained from Item (adjustment entries) | W | Risk Warning | DECLINE |
| 27 | History of Returns. No current unpaid items | W | Risk Warning | DECLINE |
| 28 | Possible NON DDA account | W | Risk Warning | N/A |
| 29 | Customer has no unpaid returns. Account is not known to be closed. | L | | ACCEPT |
| 30 | Customer has recently paid an item and is no longer has an unpaid debt in the database | L | | ACCEPT |
| 31 | Customer has no unpaid items with limited positive history | L | | ACCEPT |

| Item Code Description | Description | Risk Level | Property Message | Decision |
|---|---|---|---|---|
| 32 | Customer has no unpaid items with strong positive history GenieAPC - APG VPOS by Phone | L | | ACCEPT |

Customers wishing to pay by phone may call from their cell phone the Genie UPN toll-free number displayed at the bottom of the VPOS Icon (See FIG. 4), anytime 24×7×365, to make their payments.

The APG VPOS by Phone invention may be an extension of the Unified Phone Number (UPN), a business method invention may allow a subscriber to use a phone number as a single identifying number, to establish a business connection to any firm, person, organization or entity, and to begin and complete a wide variety of communications and transactions with those parties, with complete security. This patent, U.S. patent Ser. No. 13/593,048 by Skala, filed on 23 Aug. 2012, which is incorporated by reference herein in its entirety. The VPOS by Phone may also an extension of the GenieAPG, and the Genie Gateway unified communications platform patents, previously filed with the U.S. Patent Office, Non-Provisional Publication No. 20160071069 by Skala, which fully integrate making payments with its robust unified communications, which is incorporated herein by reference in its entirety.

When customers call a merchant's unique UPN toll-free number customers may be greeted with, thank you for calling and welcome to the ABC Company (merchant's name) and one or more of the following non-limiting options may be automatically presented by the system:

To connect your call, press 1
To leave a message, press 2
To send a payment, press 3
To send a fax, press 4
To page, press 5

If the cell phone number (caller ID) is recognized the customer may be greeted with their name, hello Tom Smart, please enter the amount of the payment you wish to send. The payment sent may be processed under the identical terms that may be pre-selected by the merchant, and as if the customer clicked on the APG VPOS and processed their payment online.

If the cell phone number is not recognized the customer may be asked to confirm their cell number, with a simple message, I see that you are calling from 213-123-4567. If this is your cell number please press 1, if this is not your cell number, please call back from your cell phone anytime.

1. If the customer presses 1 to confirm their cell phone number they may be presented with the following prompts:
2. At the sound of the tone please say your first and last name.
3. Please enter the 9 digit bank routing number printed at the bottom of your check.
4. Please enter the dollar amount of the payment you wish to make.
5. Please enter the cents.
6. At the sound of the tone please describe the nature of this payment.
7. Thank you, in a moment we may send you a text message asking you to confirm this payment, this payment may only be processed when we receive your confirmation and may be voided if we do not receive your confirmation.

On approval, and within 5 minutes, a GenieAPG may be emailed to the merchant for 100% of the payment. The GenieAPG may be a PDF attachment, the email may also include two WAV file attachments with the customers first and last name, and the description of the payment, recorded in the customer's own voice. These emails may be saved as the payment confirmation in the event the merchant needs to review the payment with their customer at a future date.

VPOS for Call Centers

The VPOS for Call Centers (APG VPOS for Call Centers) embodiment may be a new proprietary suite of digital solutions designed as an extension to the GenieAPG patents and to leverage several of Genie Gateway's existing inventions in order to enable a merchant to support customer tendering of their accounts payable with the assistance of one or more VPOS Operators working in a Virtual Call Center (See FIGS. 16-20).

Figure 22:
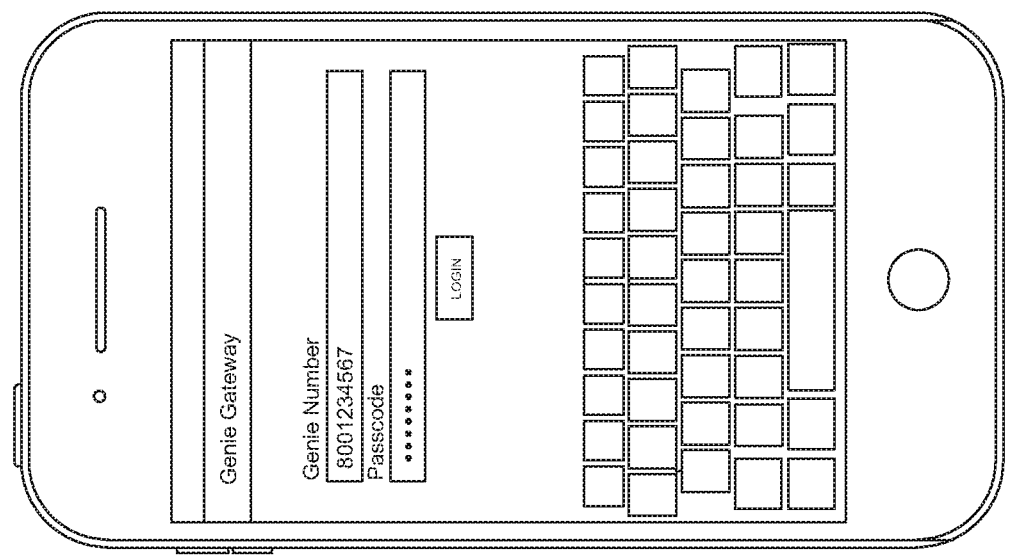
FIG. 22 is a screenshot of a login screen for a mobile application for a non-bank e-wallet, according to one embodiment of the invention.
Figure 23:
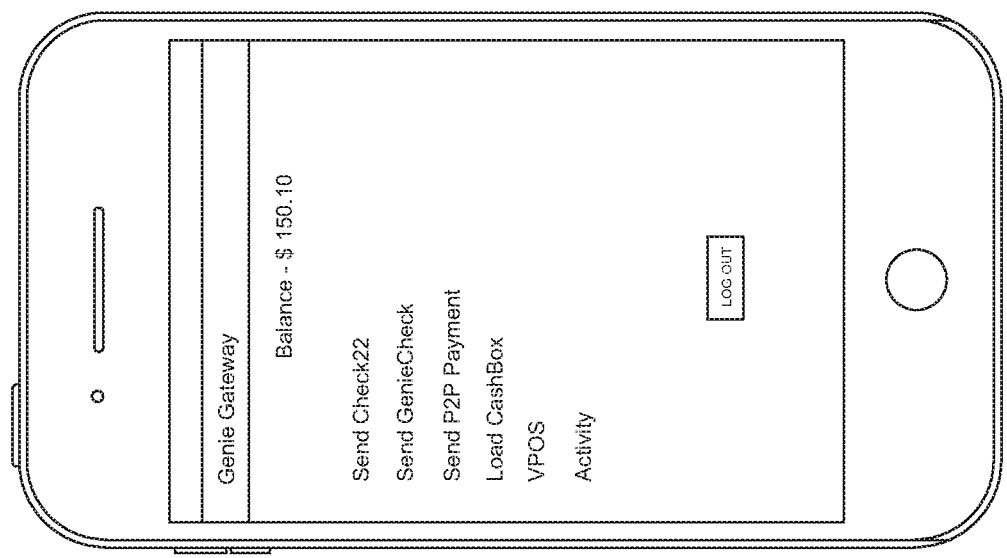
FIG. 23 is a screenshot of an activity screen for a mobile application for a non-bank e-wallet, according to one embodiment of the invention.

Through the VPOS for Call Centers, merchant representatives, working as VPOS Operators for the subscribing merchant, may work with customers to facilitate the customer's use of any or all of the APG's methods of rendering payment, include one or more of:

Assist a customer with initial sign-up for the service
Contact existing customers about issues with payment
  Via email
  Via phone
  Via text message
Take customer orders from multiple sources and generate related payment instruments for customer approval
  From email
  From phone calls
  From any other source designated by the customer
Create VPOS APG icons for specific payments due, which may then be dispatched to the customer
  Via email All of these functions are surrounded by security measures that block the Call Center Operator from accessing
  The customer's underlying
    GenieChecking details
    DDA account information
  The Merchant's underlying
    GenieChecking details VPOS Via Mobile App The VPOS via Mobile App (APG VPOS via Mobile App) invention may be a new proprietary suite of digital solutions designed as an extension to the GenieAPG patents and to leverage several of Genie Gateway's existing inventions in order to extend the same functionality to mobile and cellular devices as that found through the web interfaces (See FIGS. 22-23).

Smartphones and tablets generally provide users with access to the web-based features of the Check 22 VPOS through the use of their built-in web browsers. However, the limited display capabilities and user input methods of such devices make using an interface designed for larger desktop and laptop systems inconvenient at best and frustrating at worst.

The VPOS Mobile App may be designed to operate natively on tablets and smartphones, and to surface the most important features of the broader invention in a fashion that may be most convenient on such devices, given their limited displays and controls.

Once signed in through the VPOS Mobile App, the user may be presented with the same general functionality as in the web UI, arranged for maximum usability on a mobile device.

VPOS on TV

Figure 21:
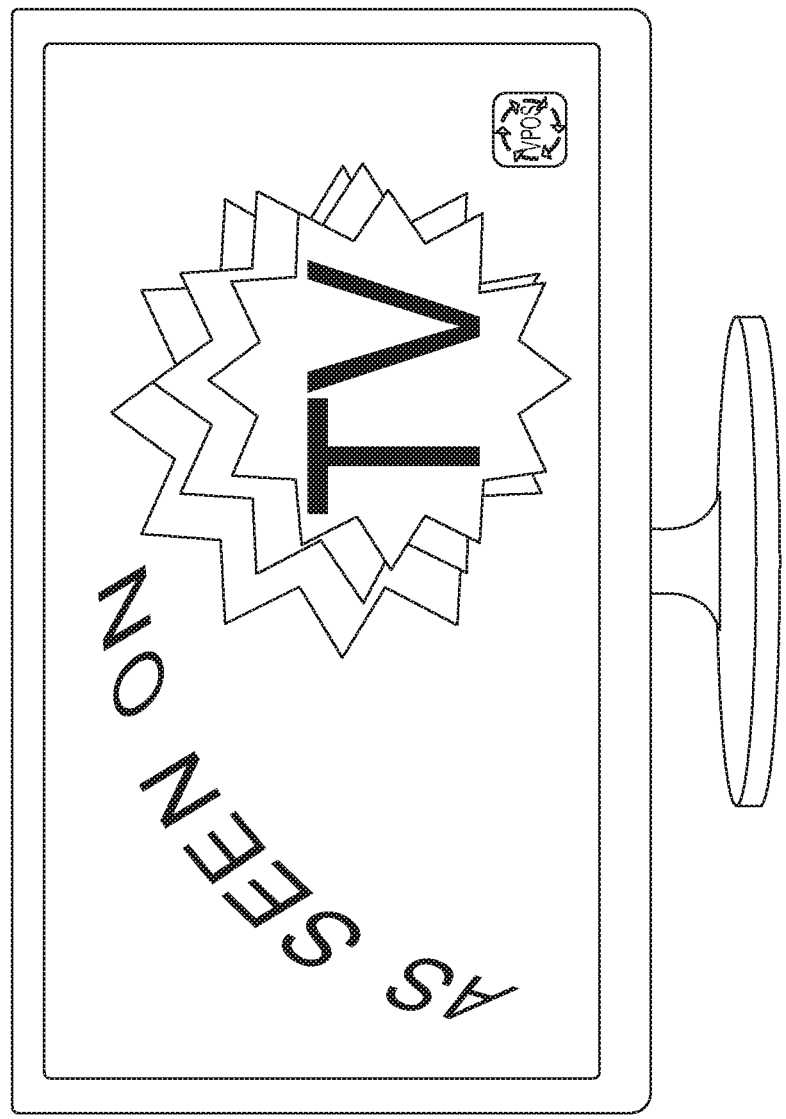
FIG. 21 is a prophetic example of an active icon displayed on a smart TV, according to one embodiment of the invention.

The VPOS on TV (APG VPOS on TV) invention may be a new proprietary suite of digital solutions designed as an extension to the GenieAPG patents and to leverage several of Genie Gateway's existing inventions in order to change the collection, payment and settlement activities for merchants advertising on TV (See FIG. 21).

VPOS on TV may be a model where consumers may utilize a one click method, with their TV Remote Control, to pay and or complete a purchase for goods or services advertised on TV, for all Genie TV enabled service providers, instead of the traditional ways of viewers sending a payment for the goods or services advertised on their TV channels.

By tightly integrating the GenieChecking system for creating on-demand checking instruments with the CashBox P2P payments (peer-to-peer or person-to-person payments) and the newly created facilities of the VPOS on TV in to a single integrated application, enables the GenieAPG system/method/service to solve several problems which currently plague merchants and provide them with the ability to receive real-time payments for goods and services they advertise on TV, without incurring the traditional inconvenience and costs for the traditional ways of sending payments for their goods or services advertised on TV.

The Genie Gateway platform may be fully integrated its CashBox and GenieChecking with each cable TV subscription so that cable TV subscribers may have full capabilities to send, receive, and deposit funds into their new version of their cable TV subscription/CashBox. Each new cable TV subscription may also be a CashBox.

With a signal from the Genie TV platform a semitransparent VPOS on TV icon may appear at a corner on the TV screen on all channels (See FIG. 21). The viewer may use the TV Remote Control to click on the VPOS Icon and the Web enabled TV may switch to the Genie Channel web site to complete/approve the Genie transaction. A non-web TV may display the UPN Toll-Free Genie Number that may be entered on a smart cell phone with the Genie application installed or on a computer at the Genie web site.

The VPOS on TV (APG VPOS on TV) invention may be a new proprietary suite of digital solutions designed as an extension to the GenieAPG patents and to leverage several of Genie Gateway's existing inventions in order to change the collection, payment and settlement activities for merchants advertising on TV.

VPOS on TV may be a model where consumers may utilize a one click method, with their TV Remote Control, to pay and or complete a purchase for goods or services advertised on TV, for all Genie TV enabled service providers, instead of the traditional ways of viewers sending a payment for the goods or services advertised on their TV channels.

The Genie application may be placed in cable boxes on the major Cable networks with fully addressable system allowing the Genie system to be able to identify the household or user providing a more directed shopping, purchasing, and authorizing experience.

Viewers wishing to pay by phone may call from their cell phone the merchant's unique UPN toll-free number displayed at the bottom of the VPOS Icon, anytime 24×7×7365, to complete their purchase.

If the cell phone number (caller ID) may be recognized the viewer may be greeted with their name, hello Tom Smart, please enter the amount of the payment you wish to send. The payment sent may be processed under the identical terms that may be pre-selected by the advertising merchant, and as if the customer clicked on the VPOS on TV icon and processed their payment online.

If the cell phone number is not recognized the customer may be asked to confirm their cell number, with a simple message, I see that you are calling from 213-123-4567, if this is your cell number please press 1, if this is not your cell number, please call back from your cell phone anytime.

1. If the customer presses 1 to confirm their cell phone number they may be presented with the following prompts:
2. At the sound of the tone please say your first and last name.
3. Please enter the 9 digit bank routing number printed at the bottom of your check.
4. Please enter the dollar amount of the payment you wish to make.
5. Please enter the cents.
6. At the sound of the tone please describe the nature of this payment.
7. Thank you, in a moment we may send you a text message asking you to confirm this payment, this payment may only be processed when we receive your confirmation and may be voided if we do not receive your confirmation.

On approval, and within 5 minutes, a GenieAPG may be emailed to the advertising merchant for 100% of the payment. The GenieAPG may be a PDF attachment, the email may also include two WAV file attachments with the customers first and last name, and the description of the payment, recorded in the customer's own voice. These emails may be saved as the payment confirmation in the event the merchant needs to review the payment with their customer at a future date.

VPOS on the Radio

Radio audience wishing to complete a purchase for goods or services advertised while listening to a radio program, may call from their cell phone the advertiser's unique Genie UPN toll-free number announced in the commercial, anytime 24×7×7365, to make their payments.

The APG VPOS by Phone invention may be an extension of the Unified Phone Number (UPN), a business method invention which may allow a subscriber to use a phone number as a single identifying number, to establish a business connection to any firm, person, organization or entity, and to begin and complete a wide variety of communications and transactions with those parties, with complete security. This patent, U.S. patent Ser. No. 13/593,048, was issued Oct. 3, 2013. The VPOS by Phone may be also an extension of the GenieAPG, and the Genie Gateway unified communications platform patents, previously filed with the U.S. Patent Office, Non-Provisional Filing, U.S. 4008.2.8ENP, filed Sep. 1, 2015, which fully integrate making payments with its robust unified communications.

When customers call a merchant's unique UPN toll-free number customers may be greeted with, thank you for calling and welcome to the ABC Company (merchant's name):

To connect your call, press 1
To leave a message, press 2
To send a payment, press 3
To send a fax, press 4
To page, press 5

If the cell phone number (caller ID) is recognized the customer may be greeted with their name, hello Tom Smart, please enter the amount of the payment you wish to send. The payment sent may be processed under the identical terms that may be pre-selected by the merchant, and as if the customer clicked on the APG VPOS and processed their payment online.

If the cell phone number is not recognized the customer may be asked to confirm their cell number, with a simple message, I see that you are calling from 213-123-4567, if this is your cell number please press 1, if this is not your cell number, please call back from your cell phone anytime.

On approval, and within 5 minutes, a GenieAPG may be emailed to the merchant for 100% of the payment. The GenieAPG may be a PDF attachment, the email may also include two WAV file attachments with the customers first and last name, and the description of the payment, recorded in the customer's own voice. These emails may be saved as the payment confirmation in the event the merchant needs to review the payment with their customer at a future date.

Figure 24:
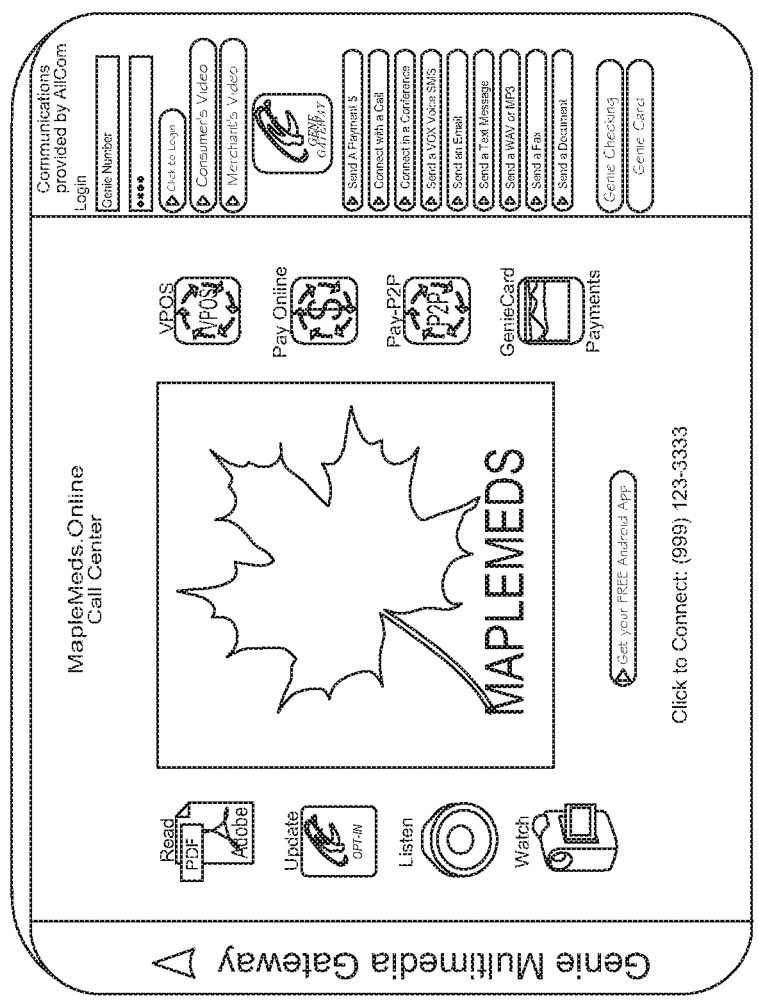
FIG. 24 is a screenshot of a customized Genie Gateway home page (a merchant service module) for a merchant where payments may be processed, including an active icon, according to one embodiment of the invention.

FIG. 24 is a screenshot of a customized Genie Gateway home page (a merchant service module) for a merchant where payments may be processed, including an active icon, according to one embodiment of the invention. There is shown a Genie Gateway which may be automatically created for a merchant to process their payments. When clicking on the VPOS button a Check22 process is initiated. In one non-limiting embodiment, the system may be programmed so that only authorized VPOS (Virtual Point Of Sale) Operators can log in.

Figure 25:
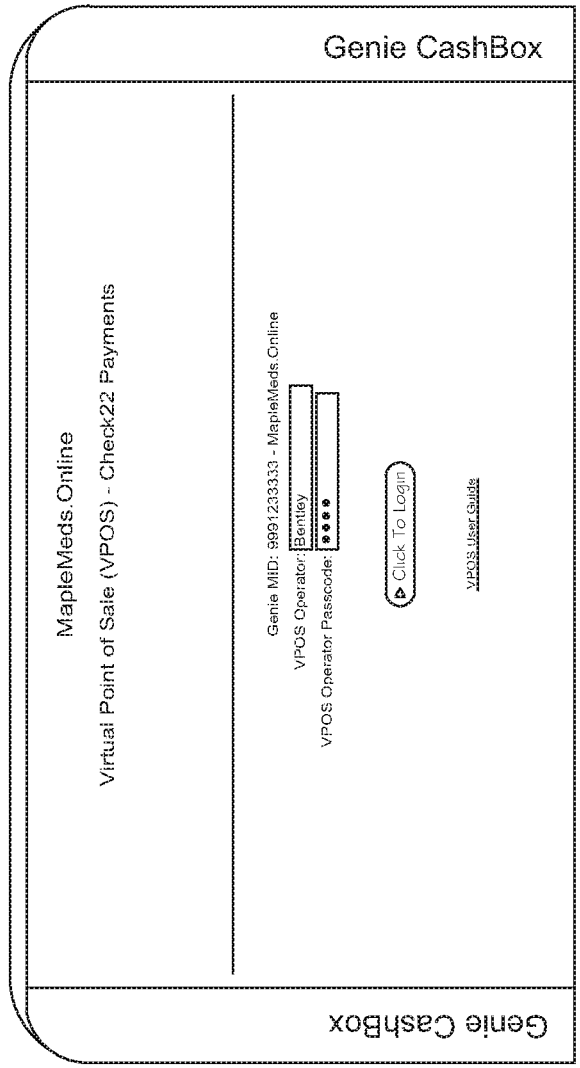
FIG. 25 is a screenshot of a login screen for a merchant to login into a VPOS (active icon) generating wizard, according to one embodiment of the invention.

FIG. 25 is a screenshot of a login screen for a merchant to login into a VPOS (active icon) generating wizard, according to one embodiment of the invention. A system may be programmed such that each merchant can create an individual VPOS account/ID for each of their employees to process payments (e.g. Check22 payments). This system provides security and includes programming such that each merchant has ability to monitor and/or track, with real-time automated reports, the sales activity of each of their employees who process payments.

Figure 26:
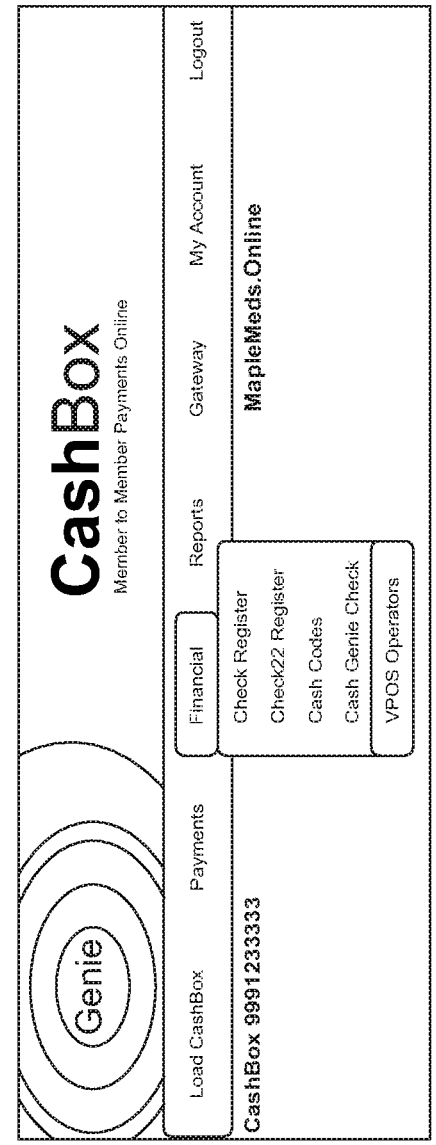
FIG. 26 is a screenshot of a CashBox service wherein VPOS operator accounts may be managed, according to one embodiment of the invention.

FIG. 26 is a screenshot of a CashBox service wherein VPOS operator accounts may be managed, according to one embodiment of the invention. In the illustrated embodiment, Check22 Merchants can create VPOS Operators by logging in to their Gateway clicking on the VPOS tab then following a wizard. This system may be fully automated.

FIG. 27 is a screenshot of a VPOS operator selection screen, according to one embodiment of the invention. Operators are able to work remotely through the system, thus enabling such operators to work at the office, at home, across the street or across the world.

FIG. 28 is a screenshot of a wizard for adding a VPOS operator, according to one embodiment of the invention. Once the information is entered, an account is automatically created for that operator within the system and they are able to process payments therein and have those payments tracked and associated with their operator account.

Figures 29, 30:
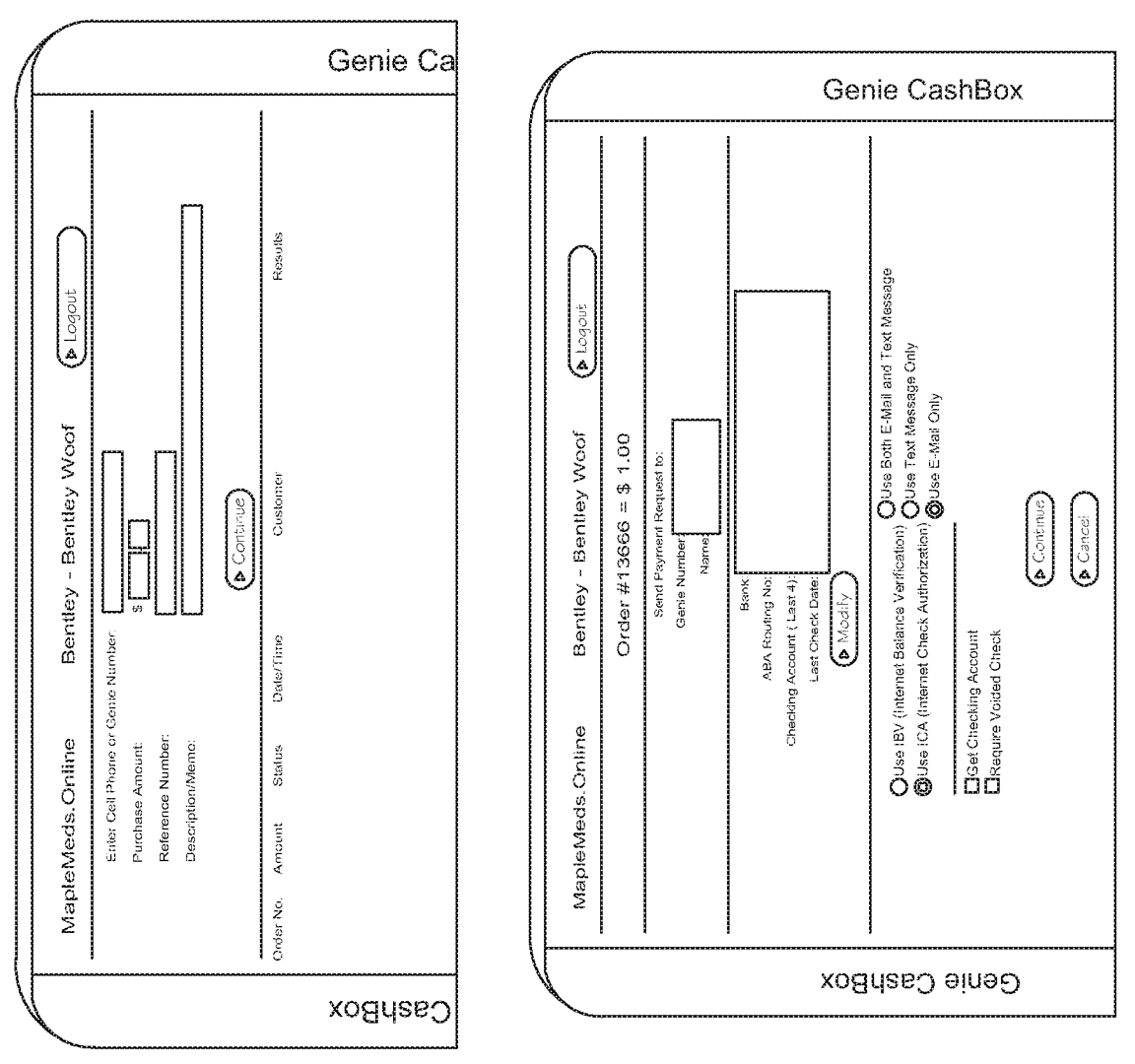

FIG. 29 is a screenshot of a web page wherein an operator may process a payment, according to one embodiment of the invention. There is shown operator enterable fields that allow the operator to enter information about a transaction/payment to be processed.

FIG. 30 is a screenshot of a screen provided to an operator when a returning payor is recognized by the system, according to one embodiment of the invention. A Genie Gateway platform maintains a database available in real-time to recognize returning customers. Once a customer's cell number, Genie Number, or invoice number or other uniquely identifying information related to an account and/or a transaction (e.g. identifying string) is recognized as a returning customer the system displays the information needed by the VPOS Operator to process the payments with just a couple of clicks on the options illustrated.

Figure 31:
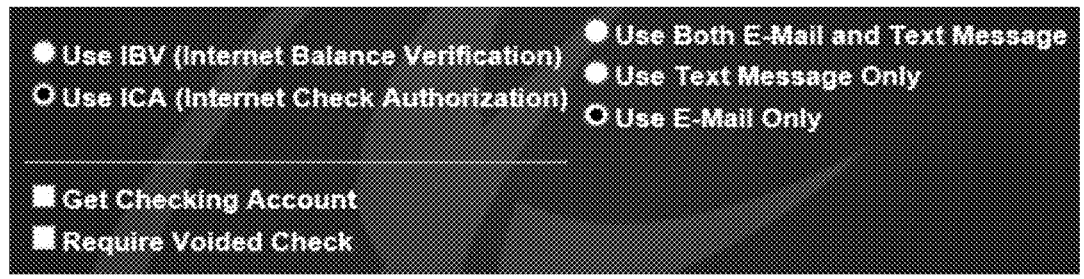
FIG. 31 is a screenshot of a security feature selection screen for payment processing, according to one embodiment of the invention.
Figure 32:
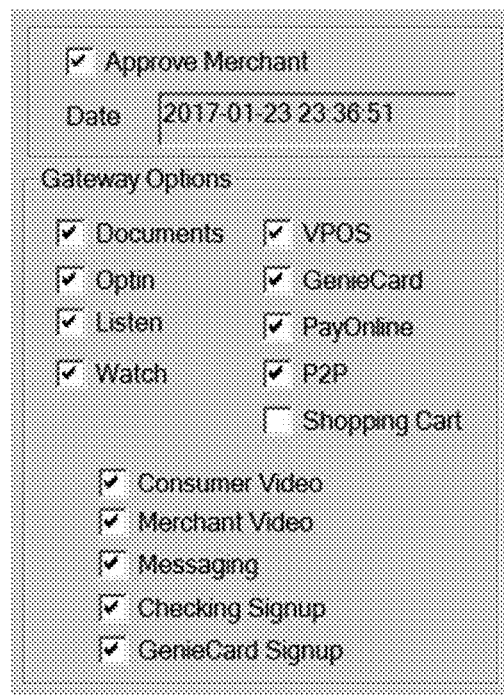

FIG. 31 is a screenshot of a security feature selection screen for payment processing, according to one embodiment of the invention. There are shown a plurality of selectable security features/processes that may be executed automatically by the payment interface when selected by the merchant.

In one non-limiting embodiment, returning customer may be processed with fewer steps than brand new customers (payors). A Genie Gateway system maintains a "Positive File" and a "Negative File" on all Check22 transactions. During the course of processing a Check22 payment the payment interface can access these file in real-time to help determine the risk associated with the subject transaction for the merchant. For example, any buyer identified in the "Negative File" may be automatically declined.

When a buyer is identified in the "Positive File" the system instantly displays information similar to that shown in FIG. 30. A merchant is no longer required to ask the traditional information required from a new customer but can simply ask their customer to verify the last 4 digits checking account and click on the continue button to complete the Check22 payment process.

FIGS. 32-36 are screenshots of merchant management panels showing selectable merchant options within a payment interface, according to one embodiment of the invention. There are shown a plurality of features/options/selectable processes/customization options that may be selected/determined by a merchant and then automatically provided by the payment interface for the benefit of the merchant and/or payor.

FIG. 37 is a screenshot of a customer (payor) information screen which enables an operator or other user to enter a new customer/payor into a payment interface, according to one embodiment of the invention. In one non-limiting embodiment, a VPOS Terminal, such as that illustrated here, enables VPOS Operators to access payment processing from any Internet enabled device. VPOS Operators simply enter the customer's information (see the illustrated fields for a non-limiting example of what information may be entered) and click on continue to process the payment.

Figure 38:
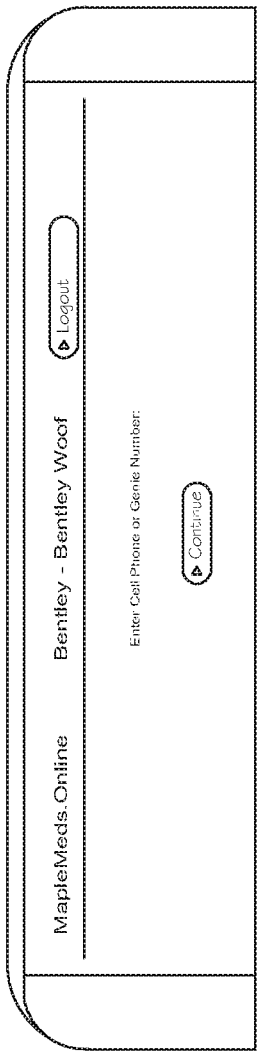
FIG. 38 is a screenshot of a confirmation screen showing a transaction number for a payment in processing, according to one embodiment of the invention.

FIG. 38 is a screenshot of a confirmation screen showing a transaction number for a payment in processing, according to one embodiment of the invention. It may be that the payment interface generates and/or displays a unique transaction number for each payment to enable merchants and VPOS operators to track all their payment transactions. It may be that both the merchant and their customers automatically receive a copy of an eSign Agreement via email after completion of each Check22 payment (generally within minutes).

Figure 39:
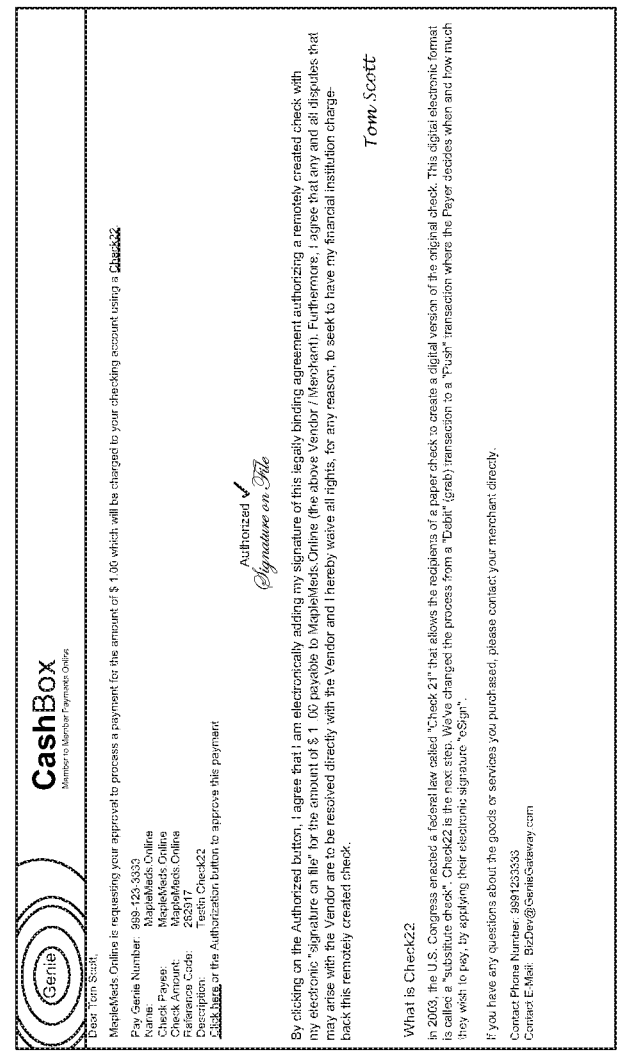
FIG. 39 is a screenshot showing a e-signature automatically created and added to a receipt by a payment interface, according to one embodiment of the invention.

FIG. 39 is a screenshot showing a e-signature automatically created and added to a receipt by a payment interface, according to one embodiment of the invention. This allows for the subsequently issued check to be valid in traditional banking systems and thereby to be cashed/processed as a normal check.

Figure 40:
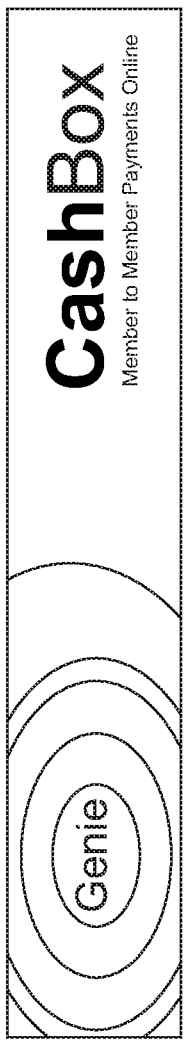
FIG. 40 is a screenshot showing a payment authorization confirmation screen of a payment interface, according to one embodiment of the invention.

FIG. 40 is a screenshot showing a payment authorization confirmation screen of a payment interface, according to one embodiment of the invention.

Figure 41:
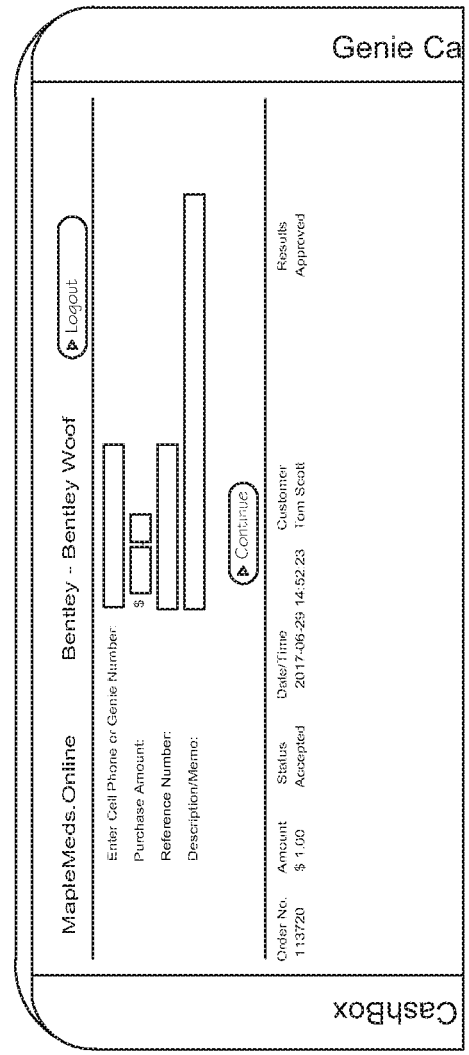
FIG. 41 is a screenshot of a VPOS Operator's Gateway screen showing a past transaction processed by that operator, according to one embodiment of the invention.

FIG. 41 is a screenshot of a VPOS Operator's Gateway screen showing a past transaction processed by that operator, according to one embodiment of the invention. Accordingly such transactions may be reviewed as needed for quality or other purposes.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method of processing a payment over a computerized network, comprising the steps of:
    a. providing, to a user through a display device but not as part of a display of a payment interface, an active payment icon associated with a particular payment obligation, wherein the active payment icon that is a software object stored within a hardware storage device of the display device and includes:
        i. a link to a custom payment interface that is separate from the active payment icon,
        ii. a visual indicator that is visually displayed over the display device,
        iii. trigger programming that interacts with a user interface on actuation through the display device, and
        iv. specific payment information about a specific payment obligation, including at least one of: an amount to be paid, a reference number, or a payor identifier,
        v. wherein actuation of the active payment icon triggers the active payment icon to provide the specific payment information over the link to the custom payment interface thereby initiating a custom interface that is pre-populated with the specific payment information;
    b. automatically on trigger by actuation of the trigger programming of the active payment icon, providing the custom payment interface whereon payment of the particular payment obligation can be satisfied by the user and displaying, through the custom payment interface, the specific payment information directly from the active payment icon;
    c. displaying to the user over the display device and through the custom payment interface, an interactive user interface that allows the user to access the payment interface to therethrough satisfy the particular payment obligation; and
    d. processing satisfaction of the particular payment obligation through the custom payment interface.

2. The method of claim 1, wherein the machine-readable information includes one or more of an invoice number or an amount to be paid.

3. The method of claim 1, wherein the machine-readable information includes one or more of a payee name, payor name, description of payment obligation, amount of the payment obligation, and due date.

4. The method of claim 1, wherein the active payment icon is associated with a non-bank e-wallet account which uses a phone number as an account number.

5. The method of claim 1, wherein the machine-readable information includes each of: a merchant's account number, a reference number, a verification option, and an email address.

6. The method of claim 1, wherein the first time a user interacts with the payment interface, they are required to enter contact and payment information, which is stored by the payment interface in association with an identification string, and subsequent times that the user interacts with the payment interface they are only required to enter the identification string associated with their contact and payment information.

7. The method of claim 1, further comprising creating a substitute check in amount of the particular payment obligation.

8. The method of claim 7, wherein the step of creating a substitute check is dependent on successfully automatically verifying the payor through one or more databases wherein positive and/or negative information about payor is reported against a history standard and automatically performing a velocity test on a payor account from which the substitute check is to be created.

9. A method of processing a payment over a computerized network, comprising the steps of:
    a. providing, to a user through a display device, an active payment icon associated with a particular payment obligation, wherein the active payment icon is provided as a software object stored within a hardware component of the display device and is separate from any payment interface and is not provided in association with a payment interface, and the active payment icon includes a link to a payment interface, includes machine-readable information stored together with the active payment icon regarding the payment to be made including an invoice number or an amount to be paid, and is associated with a non-bank e-wallet account which uses a phone number as an account number and wherein the active payment icon also displays a phone number associated within the payment interface with the particular payment obligation by an automated payment receipt system in functional communication with the payment interface whereat payment of the particular payment obligation may be satisfied;
    b. on selection of the link, providing the payment interface whereon payment of the particular payment obligation can be satisfied by the user and displaying, through the payment interface, the machine-readable information;

c. displaying to the user over the display device and through the payment interface, an interactive user interface that allows the user to satisfy the particular payment obligation; and d. processing satisfaction of the particular payment obligation through the payment interface.

10. The method of claim 9, wherein the first time a user interacts with the payment interface, they are required to enter contract and payment information, which is stored by the payment interface in association with an identification string, and subsequent times that the user interacts with the payment interface they are only required to enter the identification string associated with their contact and payment information.

11. The method of claim 10, wherein the machine-readable information further includes one or more of a payee name, payor name, description of payment obligation, amount of the patent obligation, and due date.

12. The method of claim 11, wherein the machine-readable information further includes each of: a merchant's account number, a reference number, a verification option, and an email address.

13. The method of claim 12, further comprising creating a substitute check in the amount of the particular payment obligation.

14. The method of claim 13, wherein the step of creating a substitute check is dependent on successfully automatically verifying a payor through one or more databases wherein positive and/or negative information about payors is reported against a history standard and automatically performing a velocity test on a payor account from which the substitute check is to be treated.

15. A computerized payment interface system operating over a computerized network, comprising:

a. an active payment icon that is not a payment interface and is displayed separate from any payment interface associated with particular payment obligations, wherein the active payment icon includes a link to a custom computerized payment interface and includes, stored therewith as data included within the active payment icon, machine-readable information regarding the particular payment obligation and wherein the active payment icon also displays a phone number associated within the payment interface with the particular payment obligation by an automated payment receipt system in functional communication with the payment interface whereat payment of the particular payment obligation may be satisfied;

b. a payment processing system including at least one processor;

c. a custom interactive user interface functionally coupled to the payment processing system and that is activated on selection of an active payment icon such that machine-readable information regarding the specific payment is displayed by the custom interactive user interface together with interactive user interface payment tools; and d. an icon generating module that automatically generates active payment icons associated with different specific payment obligations.

16. The computerized payment interface of claim 15, wherein the payment processing system is a non-bank e-wallet account which uses a phone number as the account number.

17. The computerized payment interface of claim 15, wherein the payment processing system generates substitute checks associated with a payor of a particular payment obligation written out to a payee of the particular payment obligation.

18. The computerized payment interface of claim 15, wherein the active payment icon has alternative programming associated with a plurality of utilization modes.

* * * * *